(12) United States Patent
Hsieh et al.

(10) Patent No.: US 10,324,275 B2
(45) Date of Patent: Jun. 18, 2019

(54) OPTICAL IMAGING LENS

(71) Applicant: Genius Electronic Optical Co., Ltd., Taichung (TW)

(72) Inventors: Hung-Chien Hsieh, Taichung (TW); Binwei Zhang, Fujian (CN); Xiaohui Zhang, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 0 days.

(21) Appl. No.: 15/441,242

(22) Filed: Feb. 24, 2017

(65) Prior Publication Data
US 2018/0188483 A1 Jul. 5, 2018

(30) Foreign Application Priority Data

Dec. 30, 2016 (CN) .......................... 2016 1 1253493

(51) Int. Cl.
*G02B 3/04* (2006.01)
*G02B 9/64* (2006.01)
(Continued)

(52) U.S. Cl.
CPC ........... *G02B 13/0045* (2013.01); *G02B 3/04* (2013.01); *G02B 9/64* (2013.01); *G02B 27/0025* (2013.01)

(58) Field of Classification Search
CPC .. G02B 13/0045; G02B 27/0025; G02B 9/60; G02B 13/18; G02B 9/62; G02B 13/004; G02B 1/041; G02B 13/06; G02B 3/04; G02B 5/208; G02B 9/64; G02B 13/0015; G02B 13/04; G02B 5/005; G02B 13/002; G02B 13/0035; G02B 9/34; G02B 13/01
(Continued)

(56) References Cited

U.S. PATENT DOCUMENTS

| 2015/0198787 A1* | 7/2015 | Kubota ................... G02B 9/64 |
| 2015/0198791 A1* | 7/2015 | Kubota .............. G02B 13/0045 359/689 |
| 2016/0306140 A1* | 10/2016 | Chen .................. G02B 13/0045 |

FOREIGN PATENT DOCUMENTS

| CN | 203595858 | 5/2014 |
| CN | 203941337 | 11/2014 |

(Continued)

OTHER PUBLICATIONS

"Office Action of Taiwan Counterpart Application," dated Jul. 25, 2017, p. 1-p. 8.
(Continued)

*Primary Examiner* — Thomas K Pham
*Assistant Examiner* — Sharrief I Broome
(74) *Attorney, Agent, or Firm* — JCIPRNET

(57) ABSTRACT

An imaging lens includes first, second, third, fourth, fifth, sixth and seventh lens elements arranged in a sequence from an object side to an image side along an optical axis. Each lens element has an object-side surface and an image-side surface. The object-side of the third lens element has a convex portion in a vicinity of a periphery. The object-side of the fifth lens element has a convex portion in a vicinity of the optical axis and a concave portion in a vicinity of a periphery. The object-side of the sixth lens element has a concave portion in a vicinity of a periphery. All of lens elements having refracting power of the imaging lens are the first, second, third, fourth, fifth, sixth and seventh lens elements.'

19 Claims, 31 Drawing Sheets

(51) Int. Cl.
*G02B 13/00* (2006.01)
*G02B 27/00* (2006.01)
(58) Field of Classification Search
USPC .................................................. 359/708–718
See application file for complete search history.

(56) References Cited

FOREIGN PATENT DOCUMENTS

| | | |
|---|---|---|
| CN | 204065534 | 12/2014 |
| CN | 205679843 | 11/2016 |
| EP | 3006977 | 4/2016 |
| JP | 2016194653 | 11/2016 |
| TW | 201638624 | 11/2016 |

OTHER PUBLICATIONS

Office Action of China Counterpart Application, dated Sep. 5, 2018, pp. 1-9.

* cited by examiner

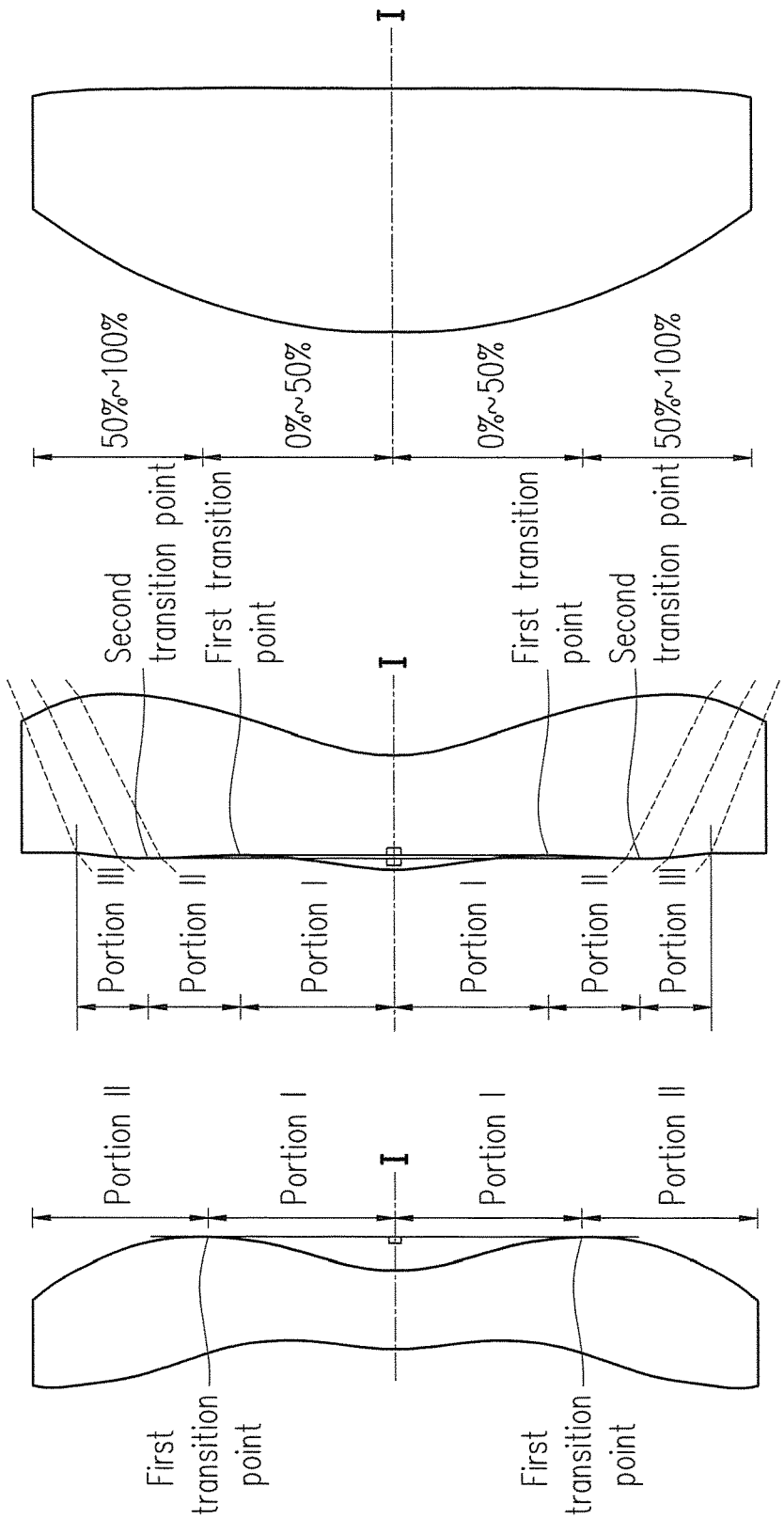

| First embodiment |||||| 
|---|---|---|---|---|---|
| System focal length=4.487 mm , Half field of view=36.052°, System length=5.980 mm , F-number=1.5 |||||| 
| Lens element | Surface | Radius of curvature(mm) | Thickness (mm) | Refractive index | Abbe number | Focal length(mm) |
| Object | | Infinite | Infinite | | | |
| Aperture stop 0 | | Infinite | -0.329 | | | |
| First lens element 1 | Object-side surface 11 | 2.535 | 0.947 | 1.545 | 55.913 | 6.959 |
| | Image-side surface 12 | 6.590 | 0.050 | | | |
| Second lens element 2 | Object-side surface 21 | 2.847 | 0.318 | 1.661 | 20.401 | -9.912 |
| | Image-side surface 22 | 1.900 | 0.196 | | | |
| Third lens element 3 | Object-side surface 31 | 2.601 | 0.528 | 1.545 | 55.913 | 8.121 |
| | Image-side surface 32 | 5.827 | 0.464 | | | |
| Fourth lens element 4 | Object-side surface 41 | -59.079 | 0.399 | 1.535 | 55.690 | 14.969 |
| | Image-side surface 42 | -7.087 | 0.050 | | | |
| Fifth lens element 5 | Object-side surface 51 | 3.932 | 0.316 | 1.661 | 20.401 | -7.689 |
| | Image-side surface 52 | 2.153 | 0.230 | | | |
| Sixth lens element 6 | Object-side surface 61 | 2.743 | 0.676 | 1.545 | 55.913 | 3.075 |
| | Image-side surface 62 | -3.963 | 0.420 | | | |
| Seventh lens element 7 | Object-side surface 71 | -3.495 | 0.523 | 1.545 | 55.913 | -3.170 |
| | Image-side surface 72 | 3.620 | 0.265 | | | |
| Light filter 9 | Object-side surface 91 | Infinite | 0.210 | 1.517 | 64.167 | |
| | Image-side surface 92 | Infinite | 0.388 | | | |
| | Image plane 100 | Infinite | | | | |

FIG.8

| Surface | K | a4 | a6 | a8 | a10 |
|---|---|---|---|---|---|
| 11 | 3.560530E-01 | 1.551180E-04 | -5.396221E-03 | 3.301840E-03 | -1.099621E-03 |
| 12 | 0.000000E+00 | -2.493274E-02 | 1.059902E-02 | -5.848353E-03 | 5.424080E-04 |
| 21 | 0.000000E+00 | -8.319990E-02 | 2.814309E-02 | -1.280233E-02 | 1.604146E-03 |
| 22 | 0.000000E+00 | -1.011990E-01 | 2.747211E-02 | -1.341409E-02 | 1.503250E-03 |
| 31 | 0.000000E+00 | -3.766517E-02 | 3.924241E-03 | -4.444738E-03 | -9.381290E-04 |
| 32 | 0.000000E+00 | -1.730449E-02 | 2.585399E-03 | -9.717306E-03 | 2.833717E-03 |
| 41 | 0.000000E+00 | -9.649370E-03 | -8.022930E-03 | -2.938754E-03 | 3.392220E-04 |
| 42 | 0.000000E+00 | 8.442169E-02 | -8.098994E-02 | 3.224660E-03 | 1.615276E-02 |
| 51 | 0.000000E+00 | -3.959911E-02 | 5.913288E-02 | -6.051923E-02 | 2.063145E-02 |
| 52 | 0.000000E+00 | -2.072114E-01 | 1.866660E-01 | -1.189576E-01 | 3.948922E-02 |
| 61 | 0.000000E+00 | -5.984590E-02 | 1.149613E-02 | -2.812686E-03 | -8.243578E-04 |
| 62 | 0.000000E+00 | 1.088036E-01 | -5.972553E-02 | 2.110669E-02 | -4.979603E-03 |
| 71 | 0.000000E+00 | -5.267094E-03 | -1.623170E-03 | 2.963313E-03 | -5.385910E-04 |
| 72 | -6.801587E+00 | -5.798152E-02 | 2.308666E-02 | -6.259877E-03 | 1.019105E-03 |
| Surface | a12 | a14 | a16 | | |
| 11 | 9.060200E-05 | 0.000000E+00 | 0.000000E+00 | | |
| 12 | 5.035300E-05 | 0.000000E+00 | 0.000000E+00 | | |
| 21 | 7.949500E-05 | 0.000000E+00 | 0.000000E+00 | | |
| 22 | 1.445500E-05 | 0.000000E+00 | 0.000000E+00 | | |
| 31 | 5.359550E-04 | -2.490000E-07 | 0.000000E+00 | | |
| 32 | -3.843100E-05 | -1.994400E-05 | 0.000000E+00 | | |
| 41 | 3.275990E-04 | -1.490300E-05 | 0.000000E+00 | | |
| 42 | -6.448133E-03 | 8.544490E-04 | 0.000000E+00 | | |
| 51 | -2.514368E-03 | -2.510600E-05 | 0.000000E+00 | | |
| 52 | -6.785478E-03 | 4.802590E-04 | 0.000000E+00 | | |
| 61 | 2.003887E-04 | 0.000000E+00 | 0.000000E+00 | | |
| 62 | 6.736980E-04 | -3.930300E-05 | 0.000000E+00 | | |
| 71 | 2.605400E-05 | 2.610000E-07 | 0.000000E+00 | | |
| 72 | -1.079200E-04 | 7.420000E-06 | -2.480000E-07 | | |

FIG.9

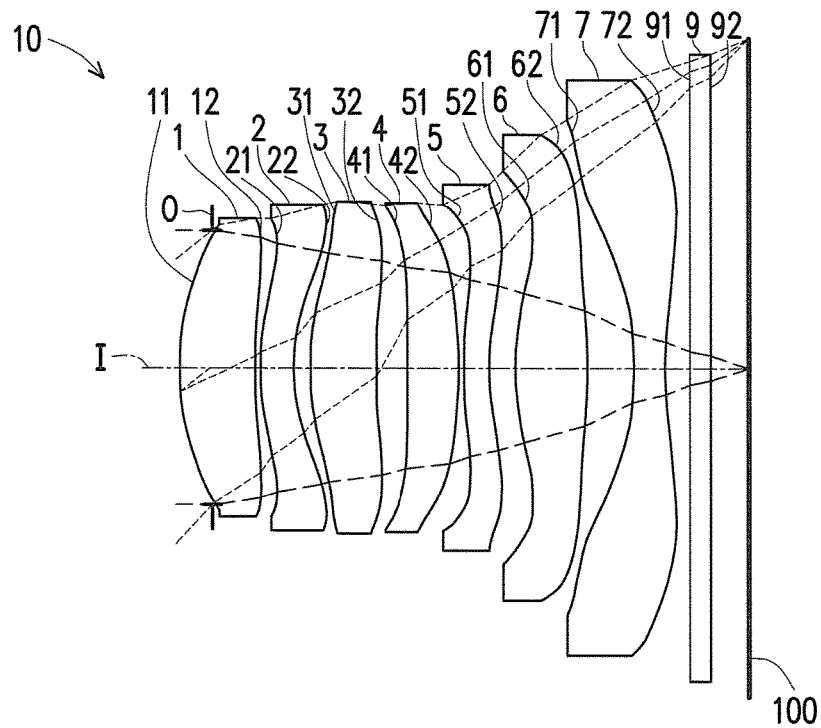
FIG. 10
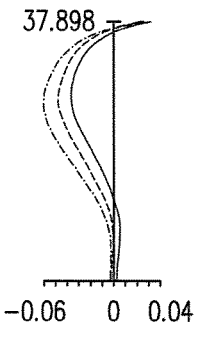
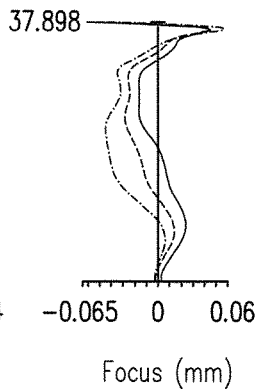
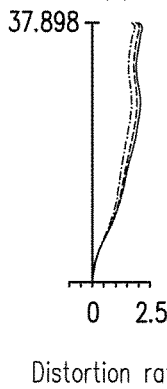
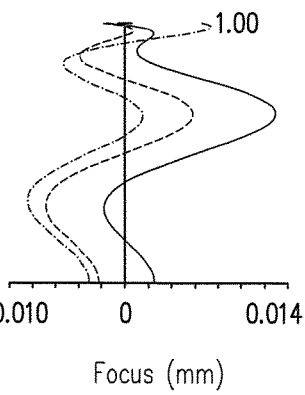
FIG. 11A   FIG. 11B   FIG. 11C   FIG. 11D

| Second embodiment | | | | | | |
|---|---|---|---|---|---|---|
| System focal length=4.195 mm , Half field of view=37.898°, System length=5.771 mm , F-number=1.5 | | | | | | |
| Lens element | Surface | Radius of curvature(mm) | Thickness (mm) | Refractive index | Abbe number | Focal length(mm) |
| Object | | Infinite | Infinite | | | |
| Aperture stop 0 | | Infinite | -0.329 | | | |
| First lens element 1 | Object-side surface 11 | 2.714 | 0.770 | 1.545 | 55.913 | 7.668 |
| | Image-side surface 12 | 6.928 | 0.050 | | | |
| Second lens element 2 | Object-side surface 21 | 2.586 | 0.335 | 1.661 | 20.401 | -10.930 |
| | Image-side surface 22 | 1.810 | 0.166 | | | |
| Third lens element 3 | Object-side surface 31 | 2.677 | 0.664 | 1.545 | 55.913 | 8.490 |
| | Image-side surface 32 | 5.770 | 0.321 | | | |
| Fourth lens element 4 | Object-side surface 41 | -106.801 | 0.523 | 1.535 | 55.690 | 7.552 |
| | Image-side surface 42 | -3.911 | 0.050 | | | |
| Fifth lens element 5 | Object-side surface 51 | 5.197 | 0.257 | 1.661 | 20.401 | -6.524 |
| | Image-side surface 52 | 2.321 | 0.270 | | | |
| Sixth lens element 6 | Object-side surface 61 | 2.658 | 0.725 | 1.545 | 55.913 | 3.117 |
| | Image-side surface 62 | -4.291 | 0.479 | | | |
| Seventh lens element 7 | Object-side surface 71 | -3.191 | 0.298 | 1.545 | 55.913 | -2.960 |
| | Image-side surface 72 | 3.393 | 0.265 | | | |
| Light filter 9 | Object-side surface 91 | Infinite | 0.210 | 1.517 | 64.167 | |
| | Image-side surface 92 | Infinite | 0.388 | | | |
| | Image plane 100 | Infinite | | | | |

FIG.12

| Surface | K | a4 | a6 | a8 | a10 |
|---|---|---|---|---|---|
| 11 | 3.560530E-01 | -1.269063E-03 | -5.745494E-03 | 3.642727E-03 | -1.201233E-03 |
| 12 | 0.000000E+00 | -2.574646E-02 | 1.063694E-02 | -6.693765E-03 | 5.352364E-04 |
| 21 | 0.000000E+00 | -7.519534E-02 | 2.587342E-02 | -1.341132E-02 | 1.269863E-03 |
| 22 | 0.000000E+00 | -9.460273E-02 | 2.676425E-02 | -1.441492E-02 | 1.260937E-03 |
| 31 | 0.000000E+00 | -4.208536E-02 | 5.716152E-03 | -3.758122E-03 | -8.435906E-04 |
| 32 | 0.000000E+00 | -1.845295E-02 | 5.335794E-04 | -1.045586E-02 | 2.845789E-03 |
| 41 | 0.000000E+00 | -2.627461E-03 | -7.058083E-03 | -3.362386E-03 | 1.651376E-04 |
| 42 | 0.000000E+00 | 9.163975E-02 | -8.065471E-02 | 3.393803E-03 | 1.624900E-02 |
| 51 | 0.000000E+00 | -4.104420E-02 | 5.688580E-02 | -6.068378E-02 | 2.046825E-02 |
| 52 | 0.000000E+00 | -2.130441E-01 | 1.865332E-01 | -1.189634E-01 | 3.951440E-02 |
| 61 | 0.000000E+00 | -6.533734E-02 | 1.010572E-02 | -2.514592E-03 | -7.632233E-04 |
| 62 | 0.000000E+00 | 1.056607E-01 | -5.964973E-02 | 2.118370E-02 | -4.970124E-03 |
| 71 | 0.000000E+00 | -6.223135E-03 | -1.324265E-03 | 3.025857E-03 | -5.303832E-04 |
| 72 | -6.801587E+00 | -5.885107E-02 | 2.302211E-02 | -6.232815E-03 | 1.023565E-03 |
| Surface | a12 | a14 | a16 | | |
| 11 | -1.046794E-05 | 0.000000E+00 | 0.000000E+00 | | |
| 12 | -1.195170E-05 | 0.000000E+00 | 0.000000E+00 | | |
| 21 | -1.388535E-05 | 0.000000E+00 | 0.000000E+00 | | |
| 22 | -9.064943E-06 | 0.000000E+00 | 0.000000E+00 | | |
| 31 | 5.538838E-04 | 1.535180E-06 | 0.000000E+00 | | |
| 32 | -1.439257E-05 | -5.365169E-06 | 0.000000E+00 | | |
| 41 | 3.032834E-04 | -1.199203E-05 | 0.000000E+00 | | |
| 42 | -6.478452E-03 | 8.360025E-04 | 0.000000E+00 | | |
| 51 | -2.541595E-03 | 1.017819E-05 | 0.000000E+00 | | |
| 52 | -6.753240E-03 | 4.941313E-04 | 0.000000E+00 | | |
| 61 | 1.946202E-04 | 0.000000E+00 | 0.000000E+00 | | |
| 62 | 6.737663E-04 | -3.956382E-05 | 0.000000E+00 | | |
| 71 | 2.623275E-05 | -5.124863E-08 | 0.000000E+00 | | |
| 72 | -1.077890E-04 | 7.349944E-06 | -2.480753E-07 | | |

FIG.13

| Third embodiment | | | | | | |
|---|---|---|---|---|---|---|
| System focal length=2.955 mm , Half field of view=46.748°, System length=5.842 mm , F-number=1.5 | | | | | | |
| Lens element | Surface | Radius of curvature(mm) | Thickness (mm) | Refractive index | Abbe number | Focal length(mm) |
| Object | | Infinite | Infinite | | | |
| Aperture stop 0 | | Infinite | -0.051 | | | |
| First lens element 1 | Object-side surface 11 | 6.677 | 0.698 | 1.545 | 55.913 | 13.027 |
| | Image-side surface 12 | 102.956 | 0.043 | | | |
| Second lens element 2 | Object-side surface 21 | 3.035 | 0.327 | 1.661 | 20.401 | -8.663 |
| | Image-side surface 22 | 1.903 | 0.080 | | | |
| Third lens element 3 | Object-side surface 31 | 2.751 | 0.687 | 1.545 | 55.913 | 6.996 |
| | Image-side surface 32 | 8.934 | 0.372 | | | |
| Fourth lens element 4 | Object-side surface 41 | 7.965 | 0.690 | 1.535 | 55.690 | 5.261 |
| | Image-side surface 42 | -4.241 | 0.011 | | | |
| Fifth lens element 5 | Object-side surface 51 | 4.658 | 0.315 | 1.661 | 20.401 | -6.726 |
| | Image-side surface 52 | 2.222 | 0.173 | | | |
| Sixth lens element 6 | Object-side surface 61 | 2.199 | 0.941 | 1.545 | 55.913 | 2.238 |
| | Image-side surface 62 | -2.342 | 0.283 | | | |
| Seventh lens element 7 | Object-side surface 71 | -5.665 | 0.325 | 1.545 | 55.913 | -3.585 |
| | Image-side surface 72 | 3.057 | 0.300 | | | |
| Light filter 9 | Object-side surface 91 | Infinite | 0.210 | 1.517 | 64.167 | |
| | Image-side surface 92 | Infinite | 0.388 | | | |
| | Image plane 100 | Infinite | | | | |

FIG.16

| Surface | K | a4 | a6 | a8 | a10 |
|---|---|---|---|---|---|
| 11 | 3.560530E-01 | 1.755951E-03 | 3.485438E-03 | -4.376099E-04 | -1.708102E-03 |
| 12 | 0.000000E+00 | -2.139994E-02 | 4.871421E-03 | -6.589536E-03 | 6.600463E-04 |
| 21 | 0.000000E+00 | -1.002467E-01 | 2.017447E-02 | -1.602753E-02 | 6.321241E-04 |
| 22 | 0.000000E+00 | -1.180453E-01 | 2.589734E-02 | -1.433157E-02 | 1.048640E-03 |
| 31 | 0.000000E+00 | -4.249315E-02 | 7.029740E-03 | -3.748889E-03 | -8.679112E-04 |
| 32 | 0.000000E+00 | -1.835584E-02 | -6.426125E-04 | -9.834440E-03 | 2.976140E-03 |
| 41 | 0.000000E+00 | 6.915741E-03 | 5.889050E-04 | -3.135749E-03 | 1.093132E-04 |
| 42 | 0.000000E+00 | 1.099116E-01 | -8.309847E-02 | 4.463213E-03 | 1.668076E-02 |
| 51 | 0.000000E+00 | -4.182730E-02 | 6.720116E-02 | -6.126808E-02 | 2.088345E-02 |
| 52 | 0.000000E+00 | -2.080894E-01 | 1.893182E-01 | -1.188032E-01 | 3.943872E-02 |
| 61 | 0.000000E+00 | -7.004598E-02 | 1.356894E-02 | -2.679806E-03 | -1.276845E-03 |
| 62 | 0.000000E+00 | 1.333029E-01 | -6.065971E-02 | 2.064905E-02 | -4.721611E-03 |
| 71 | 0.000000E+00 | -1.827963E-02 | -6.323430E-04 | 2.896875E-03 | -5.544052E-04 |
| 72 | -6.801587E+00 | -4.063486E-02 | 2.103249E-02 | -6.000666E-03 | 9.873396E-04 |
| Surface | a12 | a14 | a16 | | |
| 11 | -2.855362E-04 | 0.000000E+00 | 0.000000E+00 | | |
| 12 | 7.443309E-04 | 0.000000E+00 | 0.000000E+00 | | |
| 21 | -3.861689E-04 | 0.000000E+00 | 0.000000E+00 | | |
| 22 | -2.907706E-05 | 0.000000E+00 | 0.000000E+00 | | |
| 31 | 5.215776E-04 | -2.044148E-05 | 0.000000E+00 | | |
| 32 | -4.797362E-05 | -2.235322E-05 | 0.000000E+00 | | |
| 41 | 2.627358E-04 | -1.604363E-05 | 0.000000E+00 | | |
| 42 | -6.434522E-03 | 7.780940E-04 | 0.000000E+00 | | |
| 51 | -2.511016E-03 | -6.056095E-06 | 0.000000E+00 | | |
| 52 | -6.804530E-03 | 4.769041E-04 | 0.000000E+00 | | |
| 61 | 2.200984E-04 | 0.000000E+00 | 0.000000E+00 | | |
| 62 | 6.719178E-04 | -4.459377E-05 | 0.000000E+00 | | |
| 71 | 2.399232E-05 | -1.263683E-07 | 0.000000E+00 | | |
| 72 | -1.081198E-04 | 7.604684E-06 | -2.480753E-07 | | |

FIG.17

| Fourth embodiment |||||||
|---|---|---|---|---|---|---|
| System focal length=4.215 mm , Half field of view=37.779°, |||||||
| System length=5.793 mm , F-number=1.5 |||||||
| Lens element | Surface | Radius of curvature(mm) | Thickness (mm) | Refractive index | Abbe number | Focal length(mm) |
| Object | | Infinite | Infinite | | | |
| Aperture stop 0 | | Infinite | -0.329 | | | |
| First lens element 1 | Object-side surface 11 | 2.583 | 0.777 | 1.545 | 55.913 | 5.743 |
| | Image-side surface 12 | 13.010 | 0.164 | | | |
| Second lens element 2 | Object-side surface 21 | 2.682 | 0.261 | 1.661 | 20.401 | -10.431 |
| | Image-side surface 22 | 1.860 | 0.272 | | | |
| Third lens element 3 | Object-side surface 31 | 3.869 | 0.546 | 1.545 | 55.913 | 24.213 |
| | Image-side surface 32 | 5.195 | 0.289 | | | |
| Fourth lens element 4 | Object-side surface 41 | 28.089 | 0.522 | 1.535 | 55.690 | 4.976 |
| | Image-side surface 42 | -2.932 | 0.132 | | | |
| Fifth lens element 5 | Object-side surface 51 | 4.576 | 0.261 | 1.661 | 20.401 | -6.610 |
| | Image-side surface 52 | 2.193 | 0.418 | | | |
| Sixth lens element 6 | Object-side surface 61 | 2.971 | 0.782 | 1.545 | 55.913 | 2.869 |
| | Image-side surface 62 | -3.014 | 0.204 | | | |
| Seventh lens element 7 | Object-side surface 71 | -3.194 | 0.300 | 1.545 | 55.913 | -2.368 |
| | Image-side surface 72 | 2.249 | 0.265 | | | |
| Light filter 9 | Object-side surface 91 | Infinite | 0.210 | 1.517 | 64.167 | |
| | Image-side surface 92 | Infinite | 0.388 | | | |
| | Image plane 100 | Infinite | | | | |

FIG.20

| Surface | K | a4 | a6 | a8 | a10 |
|---|---|---|---|---|---|
| 11 | 3.560530E-01 | -6.583206E-04 | -4.004288E-03 | 2.703600E-03 | -8.464578E-04 |
| 12 | 0.000000E+00 | -1.479897E-02 | 9.630107E-03 | -4.226931E-03 | 4.015402E-04 |
| 21 | 0.000000E+00 | -9.049900E-02 | 2.862645E-02 | -1.194275E-02 | 1.494496E-03 |
| 22 | 0.000000E+00 | -9.906809E-02 | 2.695149E-02 | -1.325939E-02 | 1.648970E-03 |
| 31 | 0.000000E+00 | -3.119984E-02 | 4.291519E-03 | -3.437920E-03 | -9.683786E-04 |
| 32 | 0.000000E+00 | -3.023148E-02 | 2.327365E-03 | -1.031631E-02 | 2.505205E-03 |
| 41 | 0.000000E+00 | 1.930606E-02 | -6.106693E-03 | -4.962322E-03 | 8.826985E-04 |
| 42 | 0.000000E+00 | 1.223716E-01 | -6.554932E-02 | 1.010996E-03 | 1.386075E-02 |
| 51 | 0.000000E+00 | -3.389679E-02 | 6.396869E-02 | -5.896153E-02 | 1.935283E-02 |
| 52 | 0.000000E+00 | -1.958696E-01 | 1.825413E-01 | -1.167238E-01 | 3.868129E-02 |
| 61 | 0.000000E+00 | -7.473592E-02 | 1.368356E-02 | -1.929525E-03 | -1.020159E-03 |
| 62 | 0.000000E+00 | 1.006718E-01 | -6.178131E-02 | 2.137798E-02 | -4.787260E-03 |
| 71 | 0.000000E+00 | -9.916030E-03 | -1.977694E-03 | 3.182845E-03 | -5.165419E-04 |
| 72 | -6.801587E+00 | -5.917016E-02 | 2.336252E-02 | -6.108529E-03 | 9.984097E-04 |
| Surface | a12 | a14 | a16 | | |
| 11 | 1.622810E-05 | 0.000000E+00 | 0.000000E+00 | | |
| 12 | -5.574394E-05 | 0.000000E+00 | 0.000000E+00 | | |
| 21 | -6.876664E-05 | 0.000000E+00 | 0.000000E+00 | | |
| 22 | -2.881845E-05 | 0.000000E+00 | 0.000000E+00 | | |
| 31 | 5.424489E-04 | -4.496563E-06 | 0.000000E+00 | | |
| 32 | -6.156947E-05 | -8.651387E-06 | 0.000000E+00 | | |
| 41 | 1.187595E-04 | -4.787771E-05 | 0.000000E+00 | | |
| 42 | -5.648857E-03 | 7.540604E-04 | 0.000000E+00 | | |
| 51 | -2.719638E-03 | 8.862518E-05 | 0.000000E+00 | | |
| 52 | -6.703426E-03 | 4.778033E-04 | 0.000000E+00 | | |
| 61 | 1.996849E-04 | 0.000000E+00 | 0.000000E+00 | | |
| 62 | 6.553668E-04 | -3.955939E-05 | 0.000000E+00 | | |
| 71 | 2.510160E-05 | -1.071037E-07 | 0.000000E+00 | | |
| 72 | -1.100963E-04 | 7.714034E-06 | -2.480753E-07 | | |

FIG.21

| Fifth embodiment |||||||
|---|---|---|---|---|---|---|
| System focal length=4.122 mm , Half field of view=37.755°, System length=5.738 mm , F-number=1.5 |||||||
| Lens element | Surface | Radius of curvature(mm) | Thickness (mm) | Refractive index | Abbe number | Focal length(mm) |
| Object | | Infinite | Infinite | | | |
| Aperture stop 0 | | Infinite | -0.329 | | | |
| First lens element 1 | Object-side surface 11 | 2.729 | 0.613 | 1.545 | 55.913 | 7.343 |
| | Image-side surface 12 | 7.844 | 0.050 | | | |
| Second lens element 2 | Object-side surface 21 | 2.609 | 0.375 | 1.661 | 20.401 | -9.973 |
| | Image-side surface 22 | 1.766 | 0.150 | | | |
| Third lens element 3 | Object-side surface 31 | 2.331 | 0.485 | 1.545 | 55.913 | 8.474 |
| | Image-side surface 32 | 4.348 | 0.477 | | | |
| Fourth lens element 4 | Object-side surface 41 | 173.252 | 0.836 | 1.535 | 55.690 | 6.420 |
| | Image-side surface 42 | -3.509 | 0.050 | | | |
| Fifth lens element 5 | Object-side surface 51 | 5.096 | 0.296 | 1.661 | 20.401 | -7.235 |
| | Image-side surface 52 | 2.420 | 0.324 | | | |
| Sixth lens element 6 | Object-side surface 61 | 3.219 | 0.528 | 1.545 | 55.913 | 3.148 |
| | Image-side surface 62 | -3.484 | 0.368 | | | |
| Seventh lens element 7 | Object-side surface 71 | -5.942 | 0.321 | 1.545 | 55.913 | -2.826 |
| | Image-side surface 72 | 2.128 | 0.265 | | | |
| Light filter 9 | Object-side surface 91 | Infinite | 0.210 | 1.517 | 64.167 | |
| | Image-side surface 92 | Infinite | 0.388 | | | |
| | Image plane 100 | Infinite | | | | |

FIG.24

| Surface | K | a4 | a6 | a8 | a10 |
|---|---|---|---|---|---|
| 11 | 3.560530E-01 | 8.466305E-04 | -9.528769E-04 | 1.341410E-03 | -4.038783E-04 |
| 12 | 0.000000E+00 | -2.456736E-02 | 1.241521E-02 | -3.724974E-03 | 5.097266E-05 |
| 21 | 0.000000E+00 | -7.489920E-02 | 2.706153E-02 | -1.344918E-02 | 2.680599E-03 |
| 22 | 0.000000E+00 | -9.992672E-02 | 2.757802E-02 | -1.370359E-02 | 1.068572E-03 |
| 31 | 0.000000E+00 | -5.335930E-02 | 8.138460E-03 | -5.595275E-03 | -8.180379E-04 |
| 32 | 0.000000E+00 | -1.575499E-02 | -1.197636E-03 | -8.762393E-03 | 2.905512E-03 |
| 41 | 0.000000E+00 | 1.654471E-03 | -7.623320E-03 | -2.508729E-03 | 4.424711E-04 |
| 42 | 0.000000E+00 | 8.580461E-02 | -7.797032E-02 | 3.365872E-03 | 1.582083E-02 |
| 51 | 0.000000E+00 | -5.273229E-02 | 6.029362E-02 | -6.101310E-02 | 2.025687E-02 |
| 52 | 0.000000E+00 | -2.070907E-01 | 1.839998E-01 | -1.182435E-01 | 3.971032E-02 |
| 61 | 0.000000E+00 | -5.357694E-02 | 1.198163E-02 | -2.902448E-03 | -9.674573E-04 |
| 62 | 0.000000E+00 | 1.272745E-01 | -6.349409E-02 | 2.075155E-02 | -4.970232E-03 |
| 71 | 0.000000E+00 | -3.033858E-02 | -9.796875E-05 | 2.987252E-03 | -5.450026E-04 |
| 72 | -6.801587E+00 | -5.443542E-02 | 2.112216E-02 | -6.118438E-03 | 1.037215E-03 |
| Surface | a12 | a14 | a16 | | |
| 11 | 3.147699E-06 | 0.000000E+00 | 0.000000E+00 | | |
| 12 | -9.153761E-05 | 0.000000E+00 | 0.000000E+00 | | |
| 21 | -4.915795E-04 | 0.000000E+00 | 0.000000E+00 | | |
| 22 | 2.159214E-05 | 0.000000E+00 | 0.000000E+00 | | |
| 31 | 6.715901E-04 | 1.885118E-05 | 0.000000E+00 | | |
| 32 | 1.956521E-06 | -6.502018E-05 | 0.000000E+00 | | |
| 41 | -6.717822E-07 | -6.470498E-05 | 0.000000E+00 | | |
| 42 | -6.516736E-03 | 8.217974E-04 | 0.000000E+00 | | |
| 51 | -2.382086E-03 | 6.451663E-07 | 0.000000E+00 | | |
| 52 | -6.809355E-03 | 4.800429E-04 | 0.000000E+00 | | |
| 61 | 2.022455E-04 | 0.000000E+00 | 0.000000E+00 | | |
| 62 | 6.870500E-04 | -3.846247E-05 | 0.000000E+00 | | |
| 71 | 2.537800E-05 | 3.902620E-07 | 0.000000E+00 | | |
| 72 | -1.091281E-04 | 7.215663E-06 | -2.480753E-07 | | |

FIG.25

| Sixth embodiment | | | | | | |
|---|---|---|---|---|---|---|
| System focal length=4.474 mm , Half field of view=36.221°, System length=5.980 mm , F-number=1.5 | | | | | | |
| Lens element | Surface | Radius of curvature(mm) | Thickness (mm) | Refractive index | Abbe number | Focal length(mm) |
| Object | | Infinite | Infinite | | | |
| Aperture stop 0 | | Infinite | -0.329 | | | |
| First lens element 1 | Object-side surface 11 | 2.524 | 0.909 | 1.545 | 55.913 | 6.944 |
| | Image-side surface 12 | 6.569 | 0.050 | | | |
| Second lens element 2 | Object-side surface 21 | 2.851 | 0.313 | 1.661 | 20.401 | -9.825 |
| | Image-side surface 22 | 1.899 | 0.186 | | | |
| Third lens element 3 | Object-side surface 31 | 2.569 | 0.526 | 1.545 | 55.913 | 8.001 |
| | Image-side surface 32 | 5.776 | 0.449 | | | |
| Fourth lens element 4 | Object-side surface 41 | -49.612 | 0.425 | 1.535 | 55.690 | 14.692 |
| | Image-side surface 42 | -6.823 | 0.050 | | | |
| Fifth lens element 5 | Object-side surface 51 | 3.979 | 0.332 | 1.661 | 20.401 | -7.554 |
| | Image-side surface 52 | 2.148 | 0.211 | | | |
| Sixth lens element 6 | Object-side surface 61 | 2.741 | 0.676 | 1.545 | 55.913 | 3.077 |
| | Image-side surface 62 | -3.974 | 0.366 | | | |
| Seventh lens element 7 | Object-side surface 71 | -3.826 | 0.623 | 1.545 | 55.913 | -3.162 |
| | Image-side surface 72 | 3.335 | 0.265 | | | |
| Light filter 9 | Object-side surface 91 | Infinite | 0.210 | 1.517 | 64.167 | |
| | Image-side surface 92 | Infinite | 0.388 | | | |
| | Image plane 100 | Infinite | | | | |

FIG.28

| Surface | K | a4 | a6 | a8 | a10 |
|---|---|---|---|---|---|
| 11 | 3.560530E-01 | 3.490400E-04 | -5.407297E-03 | 3.305390E-03 | -1.101557E-03 |
| 12 | 0.000000E+00 | -2.473932E-02 | 1.057324E-02 | -5.852254E-03 | 5.435006E-04 |
| 21 | 0.000000E+00 | -8.332918E-02 | 2.817781E-02 | -1.279234E-02 | 1.608068E-03 |
| 22 | 0.000000E+00 | -1.011222E-01 | 2.745437E-02 | -1.341908E-02 | 1.500908E-03 |
| 31 | 0.000000E+00 | -3.753292E-02 | 3.904326E-03 | -4.444138E-03 | -9.380361E-04 |
| 32 | 0.000000E+00 | -1.750360E-02 | 2.888362E-03 | -9.690550E-03 | 2.833262E-03 |
| 41 | 0.000000E+00 | -8.865766E-03 | -7.937040E-03 | -2.898269E-03 | 3.545651E-04 |
| 42 | 0.000000E+00 | 8.101382E-02 | -8.061734E-02 | 3.293153E-03 | 1.612871E-02 |
| 51 | 0.000000E+00 | -4.455709E-02 | 6.000116E-02 | -6.135780E-02 | 2.065860E-02 |
| 52 | 0.000000E+00 | -2.103017E-01 | 1.865021E-01 | -1.188659E-01 | 3.949376E-02 |
| 61 | 0.000000E+00 | -5.836427E-02 | 1.187738E-02 | -2.860797E-03 | -8.215291E-04 |
| 62 | 0.000000E+00 | 1.151288E-01 | -5.989108E-02 | 2.097950E-02 | -4.988502E-03 |
| 71 | 0.000000E+00 | -6.234038E-03 | -1.667833E-03 | 2.939108E-03 | -5.417962E-04 |
| 72 | -6.801587E+00 | -5.790454E-02 | 2.315398E-02 | -6.262914E-03 | 1.017449E-03 |
| Surface | a12 | a14 | a16 | | |
| 11 | 8.786233E-05 | 0.000000E+00 | 0.000000E+00 | | |
| 12 | 5.100275E-05 | 0.000000E+00 | 0.000000E+00 | | |
| 21 | 8.118200E-05 | 0.000000E+00 | 0.000000E+00 | | |
| 22 | 1.369146E-05 | 0.000000E+00 | 0.000000E+00 | | |
| 31 | 5.354281E-04 | -6.309409E-07 | 0.000000E+00 | | |
| 32 | -3.827463E-05 | -1.949059E-05 | 0.000000E+00 | | |
| 41 | 3.312030E-04 | -1.447317E-05 | 0.000000E+00 | | |
| 42 | -6.452097E-03 | 8.583286E-04 | 0.000000E+00 | | |
| 51 | -2.462536E-03 | -2.722497E-05 | 0.000000E+00 | | |
| 52 | -6.783834E-03 | 4.821423E-04 | 0.000000E+00 | | |
| 61 | 2.016643E-04 | 0.000000E+00 | 0.000000E+00 | | |
| 62 | 6.747284E-04 | -3.880587E-05 | 0.000000E+00 | | |
| 71 | 2.578887E-05 | 2.721447E-07 | 0.000000E+00 | | |
| 72 | -1.079991E-04 | 7.438070E-06 | -2.480753E-07 | | |

FIG.29

| Seventh embodiment | | | | | | |
|---|---|---|---|---|---|---|
| System focal length=4.497 mm, Half field of view=36.066°, System length=5.989 mm, F-number=1.5 | | | | | | |
| Lens element | Surface | Radius of curvature(mm) | Thickness (mm) | Refractive index | Abbe number | Focal length(mm) |
| Object | | Infinite | Infinite | | | |
| Aperture stop 0 | | Infinite | -0.476 | | | |
| First lens element 1 | Object-side surface 11 | 2.532 | 0.821 | 1.545 | 55.913 | 5.378 |
| | Image-side surface 12 | 16.148 | 0.337 | | | |
| Second lens element 2 | Object-side surface 21 | 3.037 | 0.281 | 1.661 | 20.401 | -8.465 |
| | Image-side surface 22 | 1.901 | 0.190 | | | |
| Third lens element 3 | Object-side surface 31 | 5.097 | 0.697 | 1.545 | 55.913 | 7.935 |
| | Image-side surface 32 | -27.713 | 0.396 | | | |
| Fourth lens element 4 | Object-side surface 41 | -18.595 | 0.717 | 1.535 | 55.690 | 31.172 |
| | Image-side surface 42 | -8.924 | 0.030 | | | |
| Fifth lens element 5 | Object-side surface 51 | 4.219 | 0.344 | 1.661 | 20.401 | -7.522 |
| | Image-side surface 52 | 2.216 | 0.182 | | | |
| Sixth lens element 6 | Object-side surface 61 | 2.157 | 0.493 | 1.545 | 55.913 | 3.074 |
| | Image-side surface 62 | -6.999 | 0.484 | | | |
| Seventh lens element 7 | Object-side surface 71 | -2.946 | 0.339 | 1.545 | 55.913 | -2.724 |
| | Image-side surface 72 | 3.135 | 0.315 | | | |
| Light filter 9 | Object-side surface 91 | Infinite | 0.210 | 1.517 | 64.167 | |
| | Image-side surface 92 | Infinite | 0.153 | | | |
| | Image plane 100 | Infinite | | | | |

FIG.32

| Surface | K | a4 | a6 | a8 | a10 |
|---|---|---|---|---|---|
| 11 | 3.560530E-01 | -2.573441E-03 | -1.138121E-03 | 7.200688E-04 | -1.983937E-04 |
| 12 | 0.000000E+00 | -1.166078E-02 | 7.976238E-03 | -2.017830E-03 | 5.450655E-05 |
| 21 | 0.000000E+00 | -1.081358E-01 | 3.816916E-02 | -1.017715E-02 | 6.999028E-04 |
| 22 | 0.000000E+00 | -1.112821E-01 | 4.016337E-02 | -1.552441E-02 | 1.836984E-03 |
| 31 | 0.000000E+00 | 6.846827E-03 | -3.674262E-04 | -3.427520E-03 | -3.960666E-04 |
| 32 | 0.000000E+00 | -9.706098E-03 | 1.423553E-03 | -8.037361E-03 | 2.318149E-03 |
| 41 | 0.000000E+00 | 5.280073E-04 | -1.205465E-02 | -1.494689E-03 | 7.757129E-04 |
| 42 | 0.000000E+00 | 5.968196E-02 | -7.275458E-02 | 8.703642E-03 | 1.156830E-02 |
| 51 | 0.000000E+00 | -5.561712E-02 | 5.523382E-02 | -5.905959E-02 | 2.270769E-02 |
| 52 | 0.000000E+00 | -2.485976E-01 | 1.975033E-01 | -1.194647E-01 | 3.969492E-02 |
| 61 | 0.000000E+00 | -9.984930E-02 | 2.203766E-02 | -8.227369E-03 | 1.667149E-04 |
| 62 | 0.000000E+00 | 1.219391E-01 | -6.996292E-02 | 2.143066E-02 | -4.985913E-03 |
| 71 | 0.000000E+00 | -5.848113E-03 | -3.325925E-03 | 3.267294E-03 | -4.988653E-04 |
| 72 | -6.801587E+00 | -5.293068E-02 | 1.886047E-02 | -5.377387E-03 | 1.005116E-03 |
| Surface | a12 | a14 | a16 | | |
| 11 | 0.000000E+00 | 0.000000E+00 | 0.000000E+00 | | |
| 12 | 0.000000E+00 | 0.000000E+00 | 0.000000E+00 | | |
| 21 | 0.000000E+00 | 0.000000E+00 | 0.000000E+00 | | |
| 22 | 0.000000E+00 | 0.000000E+00 | 0.000000E+00 | | |
| 31 | 3.519572E-04 | 0.000000E+00 | 0.000000E+00 | | |
| 32 | -1.898459E-04 | 0.000000E+00 | 0.000000E+00 | | |
| 41 | -1.244534E-04 | 0.000000E+00 | 0.000000E+00 | | |
| 42 | -4.868831E-03 | 5.755167E-04 | 0.000000E+00 | | |
| 51 | -3.213894E-03 | 0.000000E+00 | 0.000000E+00 | | |
| 52 | -6.898946E-03 | 4.819899E-04 | 0.000000E+00 | | |
| 61 | 7.614745E-05 | 0.000000E+00 | 0.000000E+00 | | |
| 62 | 6.890970E-04 | -3.823511E-05 | 0.000000E+00 | | |
| 71 | 2.456509E-05 | 0.000000E+00 | 0.000000E+00 | | |
| 72 | -1.144645E-04 | 7.263354E-06 | -1.971834E-07 | | |

FIG.33

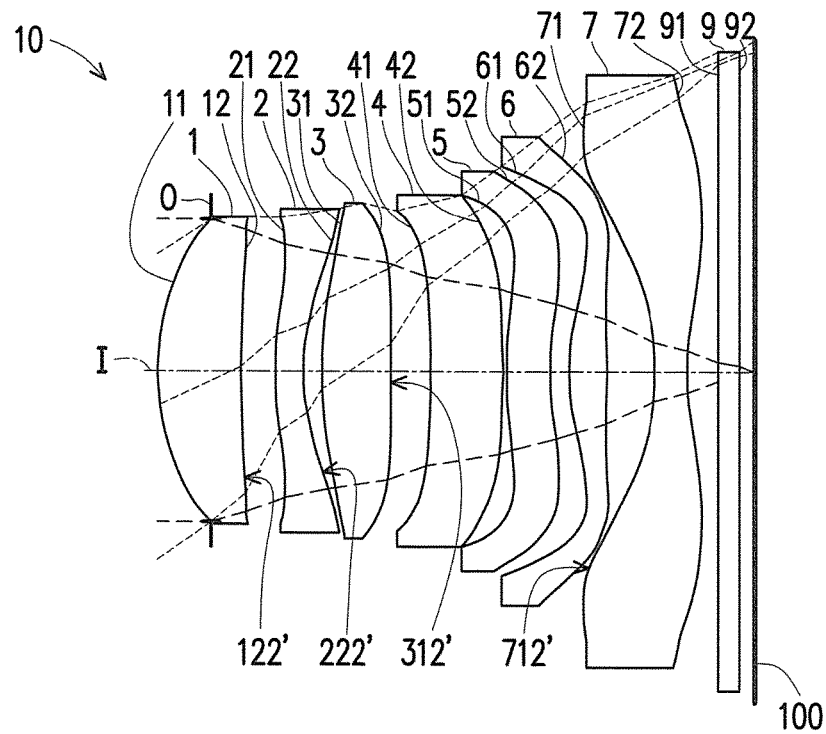
FIG. 34
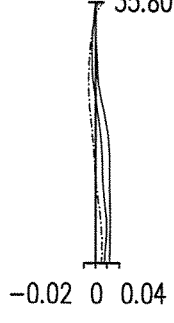
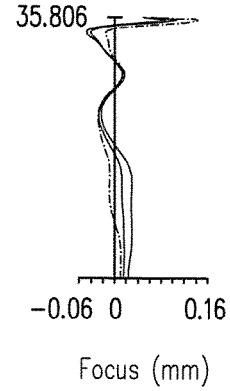
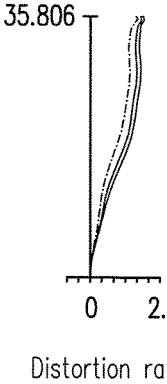
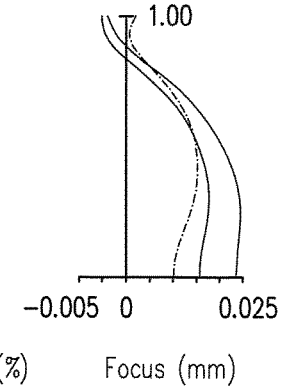
FIG. 35A  FIG. 35B  FIG. 35C  FIG. 35D

| Eighth embodiment | | | | | | |
|---|---|---|---|---|---|---|
| System focal length=4.546 mm , Half field of view=35.806°, System length=6.001 mm , F-number=1.5 | | | | | | |
| Lens element | Surface | Radius of curvature(mm) | Thickness (mm) | Refractive index | Abbe number | Focal length(mm) |
| Object | | Infinite | Infinite | | | |
| Aperture stop 0 | | Infinite | -0.496 | | | |
| First lens element 1 | Object-side surface 11 | 2.505 | 0.839 | 1.545 | 55.913 | 5.322 |
| | Image-side surface 12 | 15.887 | 0.338 | | | |
| Second lens element 2 | Object-side surface 21 | 3.013 | 0.280 | 1.661 | 20.401 | -8.501 |
| | Image-side surface 22 | 1.894 | 0.191 | | | |
| Third lens element 3 | Object-side surface 31 | 5.120 | 0.703 | 1.545 | 55.913 | 8.136 |
| | Image-side surface 32 | -32.233 | 0.396 | | | |
| Fourth lens element 4 | Object-side surface 41 | -13.902 | 0.721 | 1.535 | 55.690 | 33.345 |
| | Image-side surface 42 | -7.965 | 0.041 | | | |
| Fifth lens element 5 | Object-side surface 51 | 4.268 | 0.432 | 1.661 | 20.401 | -8.052 |
| | Image-side surface 52 | 2.281 | 0.190 | | | |
| Sixth lens element 6 | Object-side surface 61 | 2.212 | 0.380 | 1.545 | 55.913 | 3.097 |
| | Image-side surface 62 | -6.779 | 0.484 | | | |
| Seventh lens element 7 | Object-side surface 71 | -2.955 | 0.327 | 1.545 | 55.913 | -2.655 |
| | Image-side surface 72 | 2.965 | 0.315 | | | |
| Light filter 9 | Object-side surface 91 | Infinite | 0.210 | 1.517 | 64.167 | |
| | Image-side surface 92 | Infinite | 0.153 | | | |
| | Image plane 100 | Infinite | | | | |

FIG.36

| Surface | K | a4 | a6 | a8 | a10 |
|---|---|---|---|---|---|
| 11 | 3.560530E-01 | -2.509351E-03 | -1.187209E-03 | 6.907408E-04 | -1.870662E-04 |
| 12 | 0.000000E+00 | -1.157080E-02 | 7.968173E-03 | -1.993032E-03 | 5.930506E-05 |
| 21 | 0.000000E+00 | -1.085954E-01 | 3.822441E-02 | -1.013937E-02 | 7.342487E-04 |
| 22 | 0.000000E+00 | -1.117039E-01 | 4.002121E-02 | -1.550092E-02 | 1.865085E-03 |
| 31 | 0.000000E+00 | 7.224115E-03 | -3.477168E-04 | -3.349396E-03 | -3.773705E-04 |
| 32 | 0.000000E+00 | -9.648859E-03 | 1.689365E-03 | -7.993034E-03 | 2.304142E-03 |
| 41 | 0.000000E+00 | 1.561301E-03 | -1.268392E-02 | -1.424624E-03 | 8.098475E-04 |
| 42 | 0.000000E+00 | 5.916624E-02 | -7.225123E-02 | 8.733257E-03 | 1.159499E-02 |
| 51 | 0.000000E+00 | -5.311400E-02 | 5.224809E-02 | -5.912193E-02 | 2.281944E-02 |
| 52 | 0.000000E+00 | -2.493145E-01 | 1.972239E-01 | -1.196329E-01 | 3.967067E-02 |
| 61 | 0.000000E+00 | -9.955340E-02 | 2.243929E-02 | -8.410046E-03 | 2.336426E-04 |
| 62 | 0.000000E+00 | 1.259491E-01 | -7.198721E-02 | 2.140687E-02 | -4.960684E-03 |
| 71 | 0.000000E+00 | -5.991034E-03 | -3.294549E-03 | 3.272760E-03 | -4.985390E-04 |
| 72 | -6.801587E+00 | -5.353196E-02 | 1.874996E-02 | -5.361023E-03 | 1.006767E-03 |
| Surface | a12 | a14 | a16 | | |
| 11 | 0.000000E+00 | 0.000000E+00 | 0.000000E+00 | | |
| 12 | 0.000000E+00 | 0.000000E+00 | 0.000000E+00 | | |
| 21 | 0.000000E+00 | 0.000000E+00 | 0.000000E+00 | | |
| 22 | 0.000000E+00 | 0.000000E+00 | 0.000000E+00 | | |
| 31 | 3.494918E-04 | 0.000000E+00 | 0.000000E+00 | | |
| 32 | -1.975755E-04 | 0.000000E+00 | 0.000000E+00 | | |
| 41 | -1.388557E-04 | 0.000000E+00 | 0.000000E+00 | | |
| 42 | -4.857803E-03 | 5.758982E-04 | 0.000000E+00 | | |
| 51 | -3.262043E-03 | 0.000000E+00 | 0.000000E+00 | | |
| 52 | -6.897343E-03 | 4.827272E-04 | 0.000000E+00 | | |
| 61 | 7.328041E-05 | 0.000000E+00 | 0.000000E+00 | | |
| 62 | 6.930339E-04 | -3.867330E-05 | 0.000000E+00 | | |
| 71 | 2.455854E-05 | 0.000000E+00 | 0.000000E+00 | | |
| 72 | -1.143974E-04 | 7.261058E-06 | -1.979268E-07 | | |

FIG.37

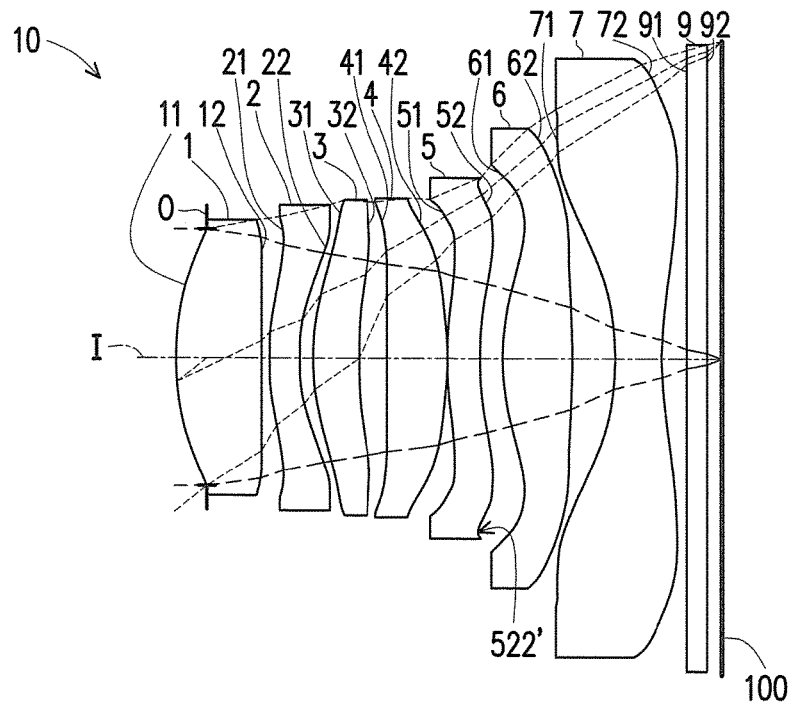
FIG. 38
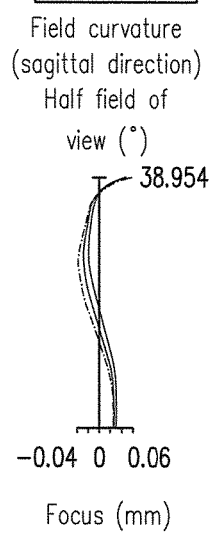
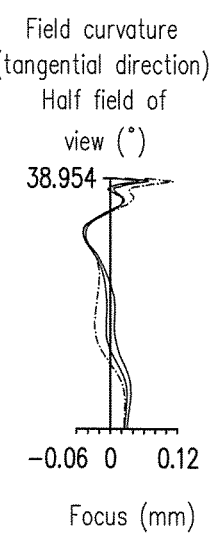
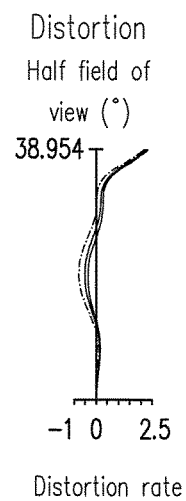
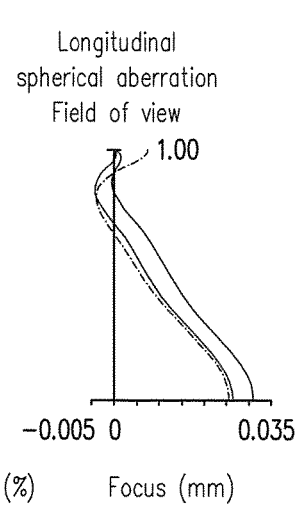
FIG. 39A  FIG. 39B  FIG. 39C  FIG. 39D

| Ninth embodiment | | | | | | |
|---|---|---|---|---|---|---|
| System focal length=4.069 mm , Half field of view=38.954°, System length=5.763 mm , F-number=1.5 | | | | | | |
| Lens element | Surface | Radius of curvature(mm) | Thickness (mm) | Refractive index | Abbe number | Focal length(mm) |
| Object | | Infinite | Infinite | | | |
| Aperture stop 0 | | Infinite | -0.329 | | | |
| First lens element 1 | Object-side surface 11 | 2.869 | 0.887 | 1.545 | 55.913 | 6.406 |
| | Image-side surface 12 | 14.128 | 0.090 | | | |
| Second lens element 2 | Object-side surface 21 | 2.653 | 0.312 | 1.661 | 20.401 | -10.178 |
| | Image-side surface 22 | 1.817 | 0.152 | | | |
| Third lens element 3 | Object-side surface 31 | 2.673 | 0.480 | 1.545 | 55.913 | 11.277 |
| | Image-side surface 32 | 4.420 | 0.301 | | | |
| Fourth lens element 4 | Object-side surface 41 | -1496.949 | 0.633 | 1.535 | 55.690 | 7.944 |
| | Image-side surface 42 | -4.251 | 0.015 | | | |
| Fifth lens element 5 | Object-side surface 51 | 4.417 | 0.333 | 1.661 | 20.401 | -6.687 |
| | Image-side surface 52 | 2.151 | 0.251 | | | |
| Sixth lens element 6 | Object-side surface 61 | 2.270 | 0.731 | 1.545 | 55.913 | 2.995 |
| | Image-side surface 62 | -5.210 | 0.451 | | | |
| Seventh lens element 7 | Object-side surface 71 | -2.795 | 0.499 | 1.545 | 55.913 | -2.690 |
| | Image-side surface 72 | 3.300 | 0.265 | | | |
| Light filter 9 | Object-side surface 91 | Infinite | 0.210 | 1.517 | 64.167 | |
| | Image-side surface 92 | Infinite | 0.152 | | | |
| | Image plane 100 | Infinite | | | | |

FIG.40

| Surface | K | a4 | a6 | a8 | a10 |
|---|---|---|---|---|---|
| 11 | 3.560530E-01 | -1.831083E-03 | -4.716703E-03 | 2.373982E-03 | -1.008840E-03 |
| 12 | 0.000000E+00 | -2.793759E-02 | 1.065477E-02 | -6.362820E-03 | 6.503663E-04 |
| 21 | 0.000000E+00 | -8.142004E-02 | 2.658469E-02 | -1.343191E-02 | 1.581239E-03 |
| 22 | 0.000000E+00 | -9.501888E-02 | 2.863495E-02 | -1.446493E-02 | 1.112728E-03 |
| 31 | 0.000000E+00 | -3.563454E-02 | 6.446896E-03 | -3.591586E-03 | -8.469367E-04 |
| 32 | 0.000000E+00 | -1.332584E-02 | 8.993063E-04 | -1.047937E-02 | 2.829386E-03 |
| 41 | 0.000000E+00 | 1.363003E-02 | -9.111217E-03 | -3.353225E-03 | 1.943227E-04 |
| 42 | 0.000000E+00 | 8.806770E-02 | -8.244611E-02 | 3.307133E-03 | 1.634069E-02 |
| 51 | 0.000000E+00 | -5.104423E-02 | 5.401157E-02 | -5.885273E-02 | 2.090128E-02 |
| 52 | 0.000000E+00 | -2.304642E-01 | 1.907574E-01 | -1.184328E-01 | 3.939697E-02 |
| 61 | 0.000000E+00 | -7.022665E-02 | 1.012262E-02 | -3.260455E-03 | -6.036168E-04 |
| 62 | 0.000000E+00 | 1.059666E-01 | -6.363867E-02 | 2.149311E-02 | -4.951985E-03 |
| 71 | 0.000000E+00 | 1.013405E-03 | -1.814374E-03 | 2.991746E-03 | -5.110218E-04 |
| 72 | -6.801587E+00 | -5.865216E-02 | 2.469324E-02 | -6.260945E-03 | 1.001229E-03 |

| Surface | a12 | a14 | a16 |
|---|---|---|---|
| 11 | 0.000000E+00 | 0.000000E+00 | 0.000000E+00 |
| 12 | 0.000000E+00 | 0.000000E+00 | 0.000000E+00 |
| 21 | 0.000000E+00 | 0.000000E+00 | 0.000000E+00 |
| 22 | 0.000000E+00 | 0.000000E+00 | 0.000000E+00 |
| 31 | 5.201477E-04 | 0.000000E+00 | 0.000000E+00 |
| 32 | -3.634912E-06 | 0.000000E+00 | 0.000000E+00 |
| 41 | 2.876965E-04 | 0.000000E+00 | 0.000000E+00 |
| 42 | -6.431376E-03 | 8.398187E-04 | 0.000000E+00 |
| 51 | -2.647013E-03 | 0.000000E+00 | 0.000000E+00 |
| 52 | -6.778374E-03 | 4.833546E-04 | 0.000000E+00 |
| 61 | 1.624394E-04 | 0.000000E+00 | 0.000000E+00 |
| 62 | 6.779089E-04 | -3.906261E-05 | 0.000000E+00 |
| 71 | 2.763994E-05 | 0.000000E+00 | 0.000000E+00 |
| 72 | -1.090023E-04 | 7.378129E-06 | -2.226351E-07 |

FIG.41

| Optical parameters | First embodiment | Second embodiment | Third embodiment | Fourth embodiment | Fifth embodiment | Sixth embodiment | Seventh embodiment | Eighth embodiment | Ninth embodiment |
|---|---|---|---|---|---|---|---|---|---|
| T1 | 0.947 | 0.770 | 0.698 | 0.777 | 0.613 | 0.909 | 0.821 | 0.839 | 0.887 |
| G12 | 0.050 | 0.050 | 0.043 | 0.164 | 0.050 | 0.050 | 0.337 | 0.338 | 0.090 |
| T2 | 0.318 | 0.335 | 0.327 | 0.261 | 0.375 | 0.313 | 0.281 | 0.280 | 0.312 |
| G23 | 0.196 | 0.166 | 0.080 | 0.272 | 0.150 | 0.186 | 0.190 | 0.191 | 0.152 |
| T3 | 0.528 | 0.664 | 0.687 | 0.546 | 0.485 | 0.526 | 0.697 | 0.703 | 0.480 |
| G34 | 0.464 | 0.321 | 0.372 | 0.289 | 0.477 | 0.449 | 0.396 | 0.396 | 0.301 |
| T4 | 0.399 | 0.523 | 0.690 | 0.522 | 0.836 | 0.425 | 0.717 | 0.721 | 0.633 |
| G45 | 0.050 | 0.050 | 0.011 | 0.132 | 0.050 | 0.050 | 0.030 | 0.041 | 0.015 |
| T5 | 0.316 | 0.257 | 0.315 | 0.261 | 0.296 | 0.332 | 0.344 | 0.432 | 0.333 |
| G56 | 0.230 | 0.270 | 0.173 | 0.418 | 0.324 | 0.211 | 0.182 | 0.190 | 0.251 |
| T6 | 0.676 | 0.725 | 0.941 | 0.782 | 0.528 | 0.676 | 0.493 | 0.380 | 0.731 |
| G67 | 0.420 | 0.479 | 0.283 | 0.204 | 0.368 | 0.366 | 0.484 | 0.484 | 0.451 |
| T7 | 0.523 | 0.298 | 0.325 | 0.300 | 0.321 | 0.623 | 0.339 | 0.327 | 0.499 |
| BFL | 0.864 | 0.864 | 0.898 | 0.864 | 0.864 | 0.864 | 0.678 | 0.678 | 0.628 |
| EFL | 4.487 | 4.195 | 2.955 | 4.215 | 4.122 | 4.474 | 4.497 | 4.546 | 4.069 |
| TTL | 5.980 | 5.771 | 5.842 | 5.793 | 5.738 | 5.980 | 5.989 | 6.001 | 5.763 |
| ALT | 3.707 | 3.572 | 3.982 | 3.450 | 3.454 | 3.804 | 3.693 | 3.682 | 3.876 |
| AAG | 1.409 | 1.336 | 0.961 | 1.479 | 1.420 | 1.312 | 1.618 | 1.641 | 1.259 |
| Tmax | 0.947 | 0.770 | 0.941 | 0.782 | 0.836 | 0.909 | 0.821 | 0.839 | 0.887 |
| Tmin | 0.316 | 0.257 | 0.315 | 0.261 | 0.296 | 0.313 | 0.281 | 0.280 | 0.312 |
| TL | 5.116 | 4.907 | 4.944 | 4.929 | 4.874 | 5.116 | 5.311 | 5.323 | 5.135 |

FIG.42

| Optical parameters | First embodiment | Second embodiment | Third embodiment | Fourth embodiment | Fifth embodiment |
|---|---|---|---|---|---|
| Tmax/Tmin | 3.000 | 3.000 | 2.990 | 3.000 | 2.827 |
| AAG/(G12+G34) | 2.744 | 3.600 | 2.318 | 3.269 | 2.693 |
| TTL/EFL | 1.333 | 1.376 | 1.977 | 1.374 | 1.392 |
| AAG/(G34+G67) | 1.595 | 1.670 | 1.468 | 3.000 | 1.679 |
| ALT/(T3+T4) | 4.000 | 3.010 | 2.894 | 3.230 | 2.614 |
| TL/(T1+T3+T6) | 2.379 | 2.274 | 2.126 | 2.341 | 2.998 |
| (T1+T6)/(T2+T5) | 2.559 | 2.524 | 2.553 | 2.988 | 1.700 |
| (G67+T7)/(T4+G45) | 2.100 | 1.357 | 0.869 | 0.770 | 0.778 |
| EFL/T3 | 8.499 | 6.319 | 4.304 | 7.723 | 8.500 |
| (T1+T2+T3)/T7 | 3.431 | 5.933 | 5.258 | 5.279 | 4.587 |
| AAG/(G34+G56) | 2.031 | 2.260 | 1.765 | 2.092 | 1.771 |
| (T6+G67)/T5 | 3.469 | 4.688 | 3.889 | 3.777 | 3.028 |
| (G34+T4)/(G12+T2) | 2.341 | 2.190 | 2.870 | 1.911 | 3.089 |
| (T3+T4)/G34 | 2.000 | 3.696 | 3.699 | 3.699 | 2.769 |
| (ALT+AAG)/EFL | 1.140 | 1.170 | 1.673 | 1.169 | 1.182 |
| EFL/T1 | 4.736 | 5.448 | 4.235 | 5.423 | 6.722 |
| (T3+G34)/T2 | 3.114 | 2.936 | 3.235 | 3.200 | 2.564 |
| Optical parameters | Seventh embodiment | Eighth embodiment | Ninth embodiment | | |
| Tmax/Tmin | 2.917 | 3.000 | 2.841 | | |
| AAG/(G12+G34) | 2.207 | 2.236 | 3.226 | | |
| TTL/EFL | 1.332 | 1.320 | 1.416 | | |
| AAG/(G34+G67) | 1.840 | 1.864 | 1.676 | | |
| ALT/(T3+T4) | 2.610 | 2.586 | 3.483 | | |
| TL/(T1+T3+T6) | 2.641 | 2.769 | 2.447 | | |
| (T1+T6)/(T2+T5) | 2.100 | 1.712 | 2.508 | | |
| (G67+T7)/(T4+G45) | 1.101 | 1.065 | 1.466 | | |
| EFL/T3 | 6.450 | 6.467 | 8.479 | | |
| (T1+T2+T3)/T7 | 5.310 | 5.567 | 3.365 | | |
| AAG/(G34+G56) | 2.800 | 2.800 | 2.281 | | |
| (T6+G67)/T5 | 2.837 | 2.000 | 3.549 | | |
| (G34+T4)/(G12+T2) | 1.800 | 1.808 | 2.323 | | |
| (T3+T4)/G34 | 3.571 | 3.600 | 3.700 | | |
| (ALT+AAG)/EFL | 1.181 | 1.171 | 1.262 | | |
| EFL/T1 | 5.478 | 5.419 | 4.587 | | |
| (T3+G34)/T2 | 3.885 | 3.928 | 2.500 | | |

FIG.43

OPTICAL IMAGING LENS

CROSS-REFERENCE TO RELATED APPLICATION

This application claims the priority benefit of Chinese application serial no. 201611253493.5, filed on Dec. 30, 2016. The entirety of the above-mentioned patent application is hereby incorporated by reference herein and made a part of this specification.

BACKGROUND OF THE INVENTION

1. Field of the Invention

The present invention relates to an optical lens, and particularly relates to an optical imaging lens.

In recent years, the popularization of portable electronic products such as mobile phones and digital cameras makes technologies related to an image module booming in development. The image module mainly contains components such as an optical imaging lens, a module holder unit (module holder unit), and a sensor (sensor). However, a trend that the mobile phones and the digital cameras become slimmer and lighter also makes requirements for miniaturization of the image module become higher. As development of technologies and miniaturization in size of a charge coupled device (charge coupled device, CCD) and a complementary metal oxide semiconductor (complementary metal oxide semiconductor, CMOS), the optical imaging lens installed in the image module also needs to be dwindled in size, but optical performances of the optical imaging lens should also be considered about. Using a seven-element lens structure as an example, a distance on an optical axis from an object-side surface of a first lens element to an image plane is great, and is detrimental to the thinning of the portable electronic products such as mobile phones and digital cameras. Therefore, an optical imaging lens having a good image quality, a large field of view, and a short system length is desired to be developed.

SUMMARY OF THE INVENTION

The invention is directed to an optical imaging lens, which still maintains good optical performance in case that a system length of the optical imaging lens is shortened.

An embodiment of the present invention provides an optical imaging lens including a first lens element, a second lens element, a third lens element, a fourth lens element, a fifth lens element, a sixth lens element, and a seventh lens element arranged in a sequence from an object side to an image side along an optical axis, wherein each of the first lens element to the seventh lens element has an object-side surface facing the object side and pervious to an imaging ray and an image-side surface facing the image side and pervious to the imaging ray. The object-side surface of the third lens element has a convex portion in a vicinity of a periphery. The object-side surface of the fifth lens element has a convex portion in a vicinity of the optical axis and a concave portion in a vicinity of a periphery. The object-side surface of the sixth lens element has a concave portion in a vicinity of a periphery. Lens elements having refracting power of the optical imaging lens are only the first lens element to the seventh lens element.

An embodiment of the present invention provides an optical imaging lens including a first lens element, a second lens element, a third lens element, a fourth lens element, a fifth lens element, a sixth lens element, and a seventh lens element arranged in a sequence from an object side to an image side along an optical axis, wherein each of the first lens element to the seventh lens element has an object-side surface facing the object side and pervious to an imaging ray and an image-side surface facing the image side and pervious to the imaging ray. The first lens element has positive refracting power. The object-side surface of the third lens element has a convex portion in a vicinity of a periphery. The object-side surface of the fifth lens element has a convex portion in a vicinity of the optical axis and a concave portion in the vicinity of the periphery. The image-side surface of the seventh lens element has a convex portion in a vicinity of a periphery. Lens elements having refracting power of the optical imaging lens are only the first lens element to the seventh lens element.

According to the above descriptions, advantageous effects of the optical imaging lens according to the embodiments of the invention are as follows. Based on the design and arrangement of the concave and convex shapes of the object-side surface or the image-side surface of the lens elements, the optical imaging lens is capable of providing good imaging quality in case that the system length of the optical imaging lens is shortened.

In order to make the aforementioned and other objectives and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic diagram illustrating a surface shape structure of a lens of a first example.

FIG. 4 is a schematic diagram illustrating a surface shape structure of a lens of a second example.

FIG. 5 is a schematic diagram illustrating a surface shape structure of a lens of a third example.

FIG. 8 shows detailed optical data of an optical imaging lens according to a first embodiment of the present invention.

FIG. 9 shows aspheric parameters of an optical imaging lens according to a first embodiment of the present invention.

FIG. 10 is a schematic diagram of an optical imaging lens according to a second embodiment of the present invention.

FIG. 11A to FIG. 11D are various aberrations and a longitudinal spherical aberration of an optical imaging lens according to a second embodiment.

FIG. 12 shows detailed optical data of an optical imaging lens according to a second embodiment of the present invention.

FIG. 13 shows aspheric parameters of an optical imaging lens according to a second embodiment of the present invention.

FIG. 16 shows detailed optical data of an optical imaging lens according to a third embodiment of the present invention.

FIG. 17 shows aspheric parameters of an optical imaging lens according to a third embodiment of the present invention.

FIG. 20 shows detailed optical data of an optical imaging lens according to a fourth embodiment of the present invention.

FIG. 21 shows aspheric parameters of an optical imaging lens according to a fourth embodiment of the present invention.

FIG. 24 shows detailed optical data of an optical imaging lens according to a fifth embodiment of the present invention.

FIG. 25 shows aspheric parameters of an optical imaging lens according to a fifth embodiment of the present invention.

FIG. 28 shows detailed optical data of an optical imaging lens according to a sixth embodiment of the present invention.

FIG. 29 shows aspheric parameters of an optical imaging lens according to a sixth embodiment of the present invention.

FIG. 32 shows detailed optical data of an optical imaging lens according to a seventh embodiment of the present invention.

FIG. 33 shows aspheric parameters of an optical imaging lens according to a seventh embodiment of the present invention.

FIG. 34 is a schematic diagram of an optical imaging lens according to an eighth embodiment of the present invention.

FIG. 35A to FIG. 35D are various aberrations and a longitudinal spherical aberrations of an optical imaging lens according to an eighth embodiment.

FIG. 36 shows detailed optical data of an optical imaging lens according to an eighth embodiment of the present invention.

FIG. 37 shows aspheric parameters of an optical imaging lens according to an eighth embodiment of the present invention.

FIG. 38 is a schematic diagram of an optical imaging lens according to a ninth embodiment of the present invention.

FIG. 39A to FIG. 39D are various aberrations and a longitudinal spherical aberration of an optical imaging lens according to a ninth embodiment.

FIG. 40 shows detailed optical data of an optical imaging lens according to a ninth embodiment of the present invention.

FIG. 41 shows aspheric parameters of an optical imaging lens according to a ninth embodiment of the present invention.

FIG. 42 shows values of important parameters of an optical imaging lens according to first to ninth embodiments of the present invention.

FIG. 43 shows values of relational expressions of important parameters of an optical imaging lens according to first to ninth embodiments of the present invention.

DESCRIPTION OF THE EMBODIMENTS

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

Figure 1:
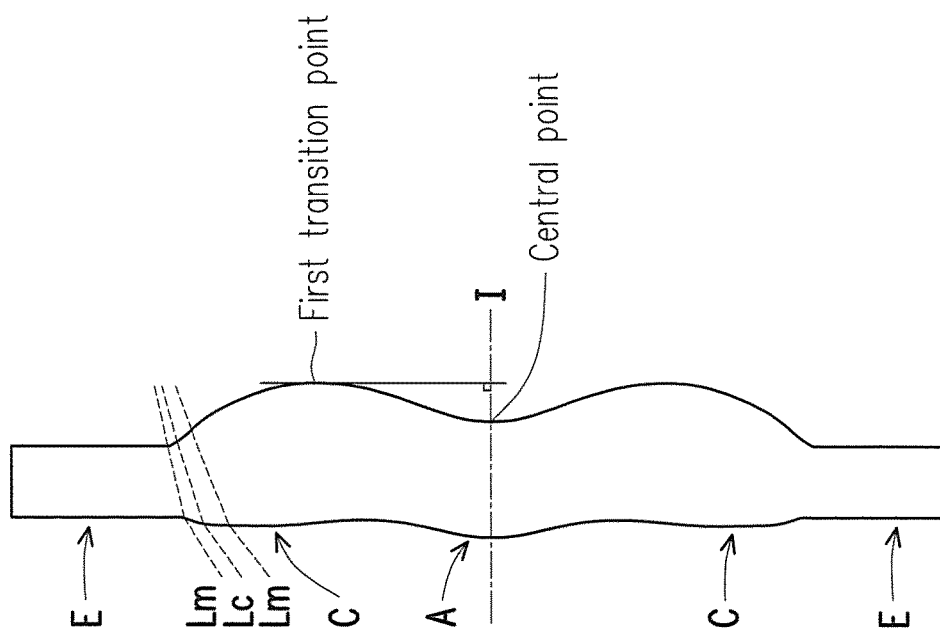
FIG. 1 is a schematic diagram illustrating a surface shape structure of a lens.

1. FIG. 1 is a radial cross-sectional view of a lens element. Before determining boundaries of those aforesaid portions, two referential points should be defined first, central point and transition point. The central point of a surface of a lens element is defined as a point of intersection of that surface and the optical axis. The transition point is defined as a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Figure 2:
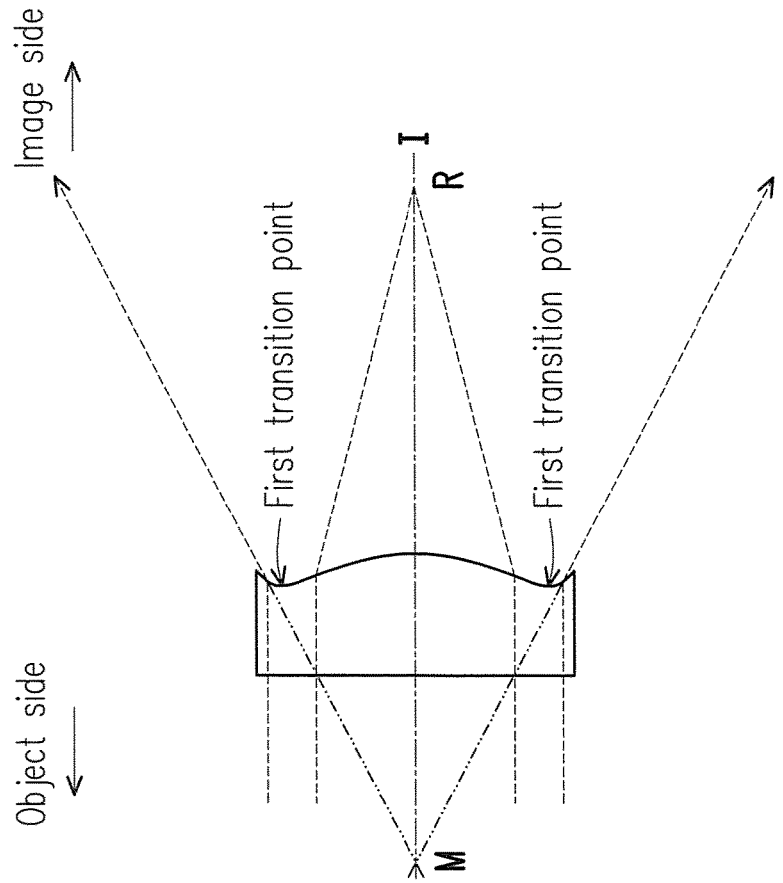
FIG. 2 is a schematic diagram illustrating surface shape concave and convex structures and a light focal point

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of the effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to that the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because that the R value at the object-side surface of the lens element is positive. The portion in a vicinity of a periphery of the lens element (portion III) has a convex shape. What is more, there is another portion having a concave shape existing between the first and second transition points (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

Figure 6:
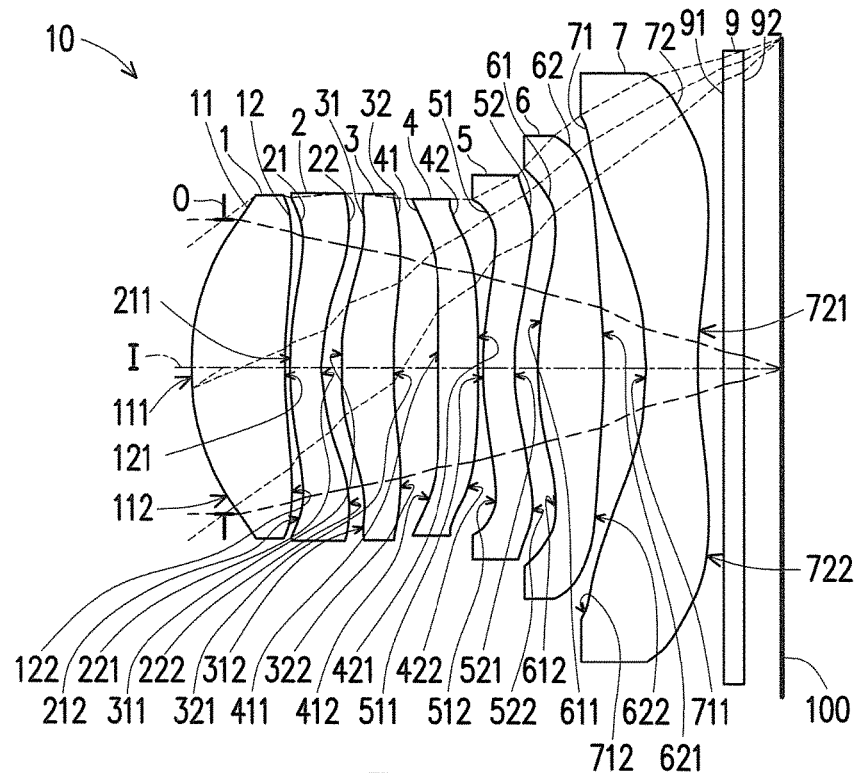
FIG. 6 is a schematic diagram of an optical imaging lens according to a first embodiment of the present invention.

FIG. 6 is a schematic diagram of an optical imaging lens according to a first embodiment of the present invention. FIG. 7A to FIG. 7D are various aberrations and a longitudinal spherical aberration in a case in which a pupil radius is 1.4958 mm of an optical imaging lens according to the first embodiment. First, referring to FIG. 6, an optical imaging lens 10 of the first embodiment of the present invention includes an aperture stop 0, a first lens element 1, a second lens element 2, a third lens element 3, a fourth lens element 4, a fifth lens element 5, a sixth lens element 6, a seventh lens element 7 and a light filter 9 arranged in a sequence from an object side to an image side along an optical axis I. An image is formed on an image plane 100 by rays emitted by an object and passed through the aperture stop 0, the first lens element 1, the second lens element 2, the third lens element 3, the fourth lens element 4, the fifth lens element 5, the sixth lens element 6, the seventh lens element 7 and the light filter 9. The light filter 9, for example, is an IR cut filter, and is used to prevent infrared rays at some wave bands in the rays from being transmitted to the image plane 100 to affect an image quality. It is supplemented that the object side is a side facing the object to be shot, and the image side is a side facing the image plane 100.

The first lens element 1, the second lens element 2, the third lens element 3, the fourth lens element 4, the fifth lens element 5, the sixth lens element 6, the seventh lens element land the light filter 9 respectively have object-side surfaces 11, 21, 31, 41, 51, 61, 71 and 91 facing the object side and pervious to imaging rays and image-side surfaces 12, 22, 32, 42, 52, 62, 72 and 92 facing the image side and pervious to the imaging rays.

In addition, in order to satisfy requirements for light-weighting of products, the first lens element 1 to the seventh lens element 7 are all made of plastic materials, but materials of the first lens element 1 to the seventh lens element 7 still are not limited thereto.

The first lens element 1 has positive refracting power. The object-side surface 11 of the first lens element 1 is a convex surface, and has a convex portion 111 in a vicinity of the optical axis I and a convex portion 112 in a vicinity of a periphery. The image-side surface 12 of the first lens element 1 has a concave portion 121 in the vicinity of the optical axis I and a convex portion 122 in the vicinity of the periphery. In the present embodiment, the object-side surface 11 and the image-side surface 12 of the first lens element 1 both are aspheric surfaces.

The second lens element 2 has negative refracting power. The object-side surface 21 of the second lens element 2 has a convex portion 211 in a vicinity of the optical axis I and a concave portion 212 in a vicinity of the periphery. The image-side surface 22 of the second lens element 2 has a concave portion 221 in a vicinity of the optical axis I and a convex portion 222 in a vicinity of the periphery. In the present embodiment, the object-side surface 21 and the image-side surface 22 of the second lens element 2 both are aspheric surfaces.

The third lens element 3 has positive refracting power. The object-side surface 31 of the third lens element 3 has a convex portion 311 in a vicinity of the optical axis I and a convex portion 312 in a vicinity of the periphery. The image-side surface 32 of the third lens element 3 has a concave portion 321 in a vicinity of the optical axis I and a convex portion 322 in a vicinity of the periphery. In the present embodiment, the object-side surface 31 and the image-side surface 32 of the third lens element 3 both are aspheric surfaces.

The fourth lens element 4 has positive refracting power. The object-side surface 41 of the fourth lens element 4 has a concave portion 411 in a vicinity of the optical axis I and a concave portion 412 in a vicinity of the periphery. The image-side surface 42 of the fourth lens element 4 has a convex portion 421 in a vicinity of the optical axis I and a convex portion 422 in a vicinity of the periphery. In the present embodiment, the object-side surface 41 and the image-side surface 42 of the fourth lens element 4 both are aspheric surfaces.

The fifth lens element 5 has negative refracting power. The object-side surface 51 of the fifth lens element 5 has a convex portion 511 in a vicinity of the optical axis I and a concave portion 512 in a vicinity of the periphery. The image-side surface 52 of the fifth lens element 5 has a concave portion 521 in a vicinity of the optical axis I and a convex portion 522 in a vicinity of the periphery. In the present embodiment, the object-side surface 51 and the image-side surface 52 of the fifth lens element 5 both are aspheric surfaces.

The sixth lens element 6 has positive refracting power. The object-side surface 61 of the sixth lens element 6 has a convex portion 611 in a vicinity of the optical axis I and a concave portion 612 in a vicinity of the periphery. The image-side surface 62 of the sixth lens element 6 has a convex portion 621 in a vicinity of the optical axis I and a convex portion 622 in a vicinity of the periphery. In the present embodiment, the object-side surface 61 and the image-side surface 62 of the sixth lens element 6 both are aspheric surfaces.

The seventh lens element 7 has negative refracting power. The object-side surface 71 of the seventh lens element 7 has a concave portion 711 in a vicinity of the optical axis I and a concave portion 712 in a vicinity of the periphery. The image-side surface 72 of the seventh lens element 7 has a concave portion 721 in a vicinity of the optical axis I and a convex portion 722 in a vicinity of the periphery. In the present embodiment, the object-side surface 71 and the image-side surface 72 of the seventh lens element 7 both are aspheric surfaces.

In the present first embodiment, only the aforementioned lens elements has refracting power, and there are only seven lens elements having refracting power.

Other detailed optical data of the first embodiment is shown in FIG. 8. Moreover, in the first embodiment, an effective focal length EFL (effective focal length) of the optical imaging lens 10 is 4.487 mm, a half field of view HFOV (half field of view) is 36.052°, a system length TTL of the optical imaging lens 10 is 5.980 mm, and a f-number $F_{NO}$ is 1.5. The system length TTL of the optical imaging lens 10 refers to a distance on the optical axis I from the object-side surface 11 of the first lens element 1 to the image plane 100.

In addition, in the present embodiment, the object-side surfaces 11, 21, 31, 41, 51, 61 and 71 and the image-side surfaces 12, 22, 32, 42, 52, 62 and 72 of the first lens element 1, the second lens element 2, the third lens element 3, the fourth lens element 4, the fifth lens element 5, the sixth lens element 6 and the seventh lens element 7 are all aspheric surfaces. Moreover, these aspheric surfaces are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad (1)$$

Wherein

Y: a distance between a point on an aspheric curve and the optical axis I;

Z: a depth of the aspheric surface (a perpendicular distance between the point on the aspheric surface that is spaced by the distance Y from the optical axis I and a tangent plane tangent to a vertex of the aspheric surface on the optical axis I);

R: a radius of curvature of the surface of the lens element;

K: a conic constant;

$a_{2i}$: $2i^{th}$ aspheric coefficient.

Aspheric constants in formula (1) from the object-side surface 11 of the first lens element 1 to the image-side surface 72 of the seventh lens element 7 are shown in FIG. 9. Number 11 in FIG. 9 indicates that the number 11 is an aspheric constant of the object-side surface 11 of the first lens element 1, and other numbers may be deduced by analogy.

In addition, key parameters and relationships between the key parameters of the optical imaging lens 10 of the first embodiment are shown in FIG. 42 and FIG. 43.

Wherein,

T1 is a center thickness of the first lens element 1 on the optical axis I;

T2 is a center thickness of the second lens element 2 on the optical axis I;

T3 is a center thickness of the third lens element 3 on the optical axis I;

T4 is a center thickness of the fourth lens element 4 on the optical axis I;

T5 is a center thickness of the fifth lens element 5 on the optical axis I;

T6 is a center thickness of the sixth lens element 6 on the optical axis I;

T7 is a center thickness of the seventh lens element 7 on the optical axis I;

G12 is an air gap between the first lens element 1 and the second lens element 2 on the optical axis I;

G23 is an air gap between the second lens element 2 and the third lens element 3 on the optical axis I;

G34 is an air gap between the third lens element 3 and the fourth lens element 4 on the optical axis I;

G45 is an air gap between the fourth lens element 4 and the fifth lens element 5 on the optical axis I;

G56 is an air gap between the fifth lens element 5 and the sixth lens element 6 on the optical axis I;

G67 is an air gap between the sixth lens element 6 and the seventh lens element 7 on the optical axis I;

G7F is an air gap between the seventh lens element 7 and the light filter 9 on the optical axis I;

AAG is a sum of six air gaps of the first lens element 1 to the seventh lens element 7 on the optical axis I;

ALT is a sum of center thicknesses of seven lenses from the first lens element 1 to the seventh lens element 7 on the optical axis I;

EFL is an effective focal length of the optical imaging lens 10;

BFL is a distance on the optical axis I from the image-side surface 72 of the seventh lens element 7 to the image plane 100;

TTL is a distance on the optical axis I from the object-side surface 11 of the first lens element 1 to the image plane 100;

TL is a distance on the optical axis I from the object-side surface 11 of the first lens element 1 to the image-side surface 72 of the seventh lens element 7;

Tmax is a maximum value of the center thicknesses of seven lenses from the first lens element 1 to the seventh lens element 7 on the optical axis I;

Tmin is a minimum value of the center thicknesses of the seven lenses from the first lens element 1 to the seventh lens element 7 on the optical axis I.

Figures 7A, 7B, 7C, 7D:
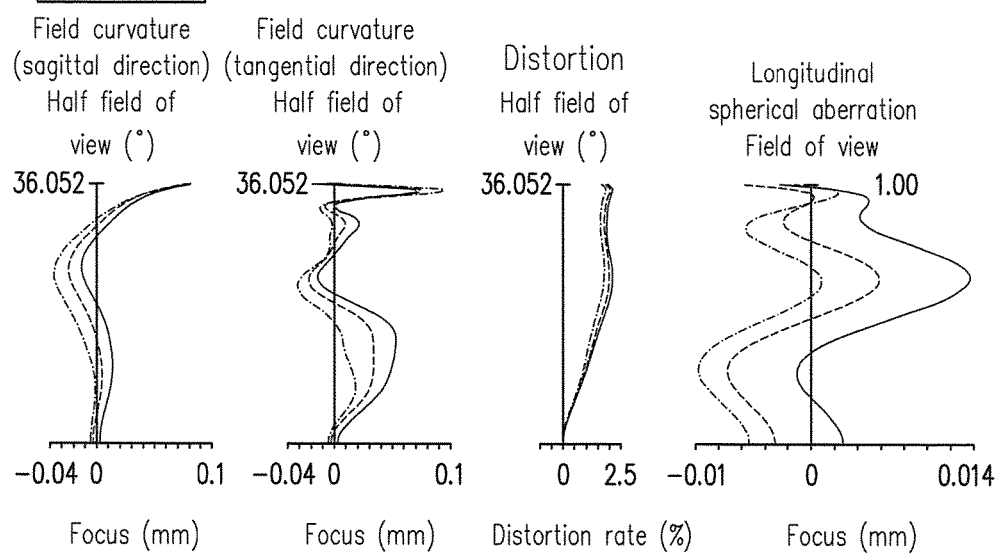
FIG. 7A to FIG. 7D are various aberrations and a longitudinal spherical aberration of an optical imaging lens according to a first embodiment.

Reference is further made to FIG. 7A to FIG. 7D. FIG. 7A and FIG. 7B respectively illustrate a field curvature aberration in a sagittal direction and a field curvature aberration in a tangential direction on the image plane 100 of the first embodiment. FIG. 7C illustrates a distortion aberration on the image plane 100 of the first embodiment. FIG. 7D illustrates a longitudinal spherical aberration of the first embodiment.

Referring to FIG. 7A, in a diagram of a field curvature aberration in the sagittal direction of FIG. 7A, focus variations of representative wavelengths of red, green, and blue of 650 nm, 555 nm and 470 nm within a range of an entire field of view fall within a range between −0.04-0.1 mm. Referring to FIG. 7B, in a diagram of the field curvature aberration in the tangential direction of FIG. 7B, focus variations of representative wavelengths of red, green, and blue of 650 nm, 555 nm and 470 nm within a range of an entire field of view fall within a range between −0.04-0.1 mm. It shows that an optical system of the first embodiment of the present invention can eliminate aberrations. Referring to FIG. 7C, a distortion aberration diagram of FIG. 7C shows that a distortion aberration of the present first embodiment is maintained within a range between 0-25%, indicating that the distortion aberration of the present first embodiment satisfies the requirements for the image quality of the optical system. Referring to FIG. 7D, in a diagram of longitudinal spherical aberrations in FIG. 7D according to the present first embodiment, curves of all wavelengths are close to each other and approach the middle, indicating that off-axis rays of different heights of each wavelength are converged nearby an imaging point. It can be seen from a deflection amplitude of a curve of each wavelength that a deviation of imaging points of the off-axis rays at different heights is controlled within a range from −0.01 mm to 0.014 mm. Therefore, the present embodiment obviously improves the aberration. In addition, distances between the representative wavelengths of red, green, and blue are also approximate to each other, this represents that imaging positions of rays of different wavelengths are quite converged. Therefore, chromatic aberration is also obviously improved. On this basis, as compared with an existing optical lens, the present first embodiment can still provide a better image quality under a condition that the TTL is shortened to be about 5.980 mm. Therefore, the present first embodiment can shorten a lens length while maintaining good optical performances.

FIG. 10 is a schematic diagram of an optical imaging lens according to a second embodiment of the present invention. FIG. 11A to FIG. 11D are various aberrations and a longitudinal spherical aberration in a case in which a pupil radius is 1.3983 mm of an optical imaging lens according to the second embodiment. First, referring to FIG. 10, the optical imaging lens 10 of the second embodiment of the present invention is substantially similar to the first embodiment, and is merely different in the optical data, the aspheric constants, and parameters between the first lens element 1, the second lens element 2, the third lens element 3, the fourth lens element 4, the fifth lens element 5, the sixth lens element 6, the seventh lens element 7 (for example, a radius of curvature, refracting power, center thickness, aspheric constants, or an EFL). Herein, it should be noted that in order to clearly show the diagram, FIG. 10 omits some of numbers of concave portions and convex portions same to those in the first embodiment.

Detailed optical data of the optical imaging lens 10 according to the second embodiment is shown in FIG. 12. Moreover, in the second embodiment, an EFL is 4.195 mm, and an HFOV is 37.898°. A TTL of the optical imaging lens 10 according to the second embodiment is 5.771 mm, and an $F_{NO}$ is 1.5.

FIG. 13 shows aspheric constants in formula (1) from the object-side surface 11 of the first lens element 1 to the image-side surface 72 of the seventh lens element 7 according to the second embodiment.

In addition, key parameters and relationships between the key parameters of the optical imaging lens 10 of the second embodiment are shown in FIG. 42 and FIG. 43.

Referring to FIG. 11A, in a diagram of a field curvature aberration in a sagittal direction of FIG. 11A, focus variations of representative wavelengths of red, green, and blue within a range of an entire field of view fall within a range between −0.06-0.04 mm. Referring to FIG. 11B, in a diagram of a field curvature aberration in a tangential direction of FIG. 11B, focus variations of the representative wavelengths of red, green, and blue within the range of the entire field of view fall within a range between −0.065-0.06 mm. Referring to FIG. 11C, a diagram of distortion aberrations in FIG. 11C shows that the distortion aberrations according to the present second embodiment are maintained within a range between 0-2.5%. Referring to FIG. 11D, in a diagram of longitudinal spherical aberrations in FIG. 11D according to the present second embodiment, deviations of imaging points of off-axis rays of different heights are controlled within a range from −0.010 mm to 0.014 mm. On this basis, as compared with an existing optical lens, the present second embodiment can still provide a better image quality under a condition that the TTL is shortened to be about 5.771 mm.

It can be known from the foregoing description that the second embodiment has the following advantages as compared with the first embodiment: the TTL of the second embodiment is smaller than that of the first embodiment; the HFOV of the second embodiment is greater than that of first embodiment; and the field curvature aberration in the sagittal direction and the field curvature aberration in the tangential direction of the second embodiment are smaller than those of the first embodiment.

Figure 14:
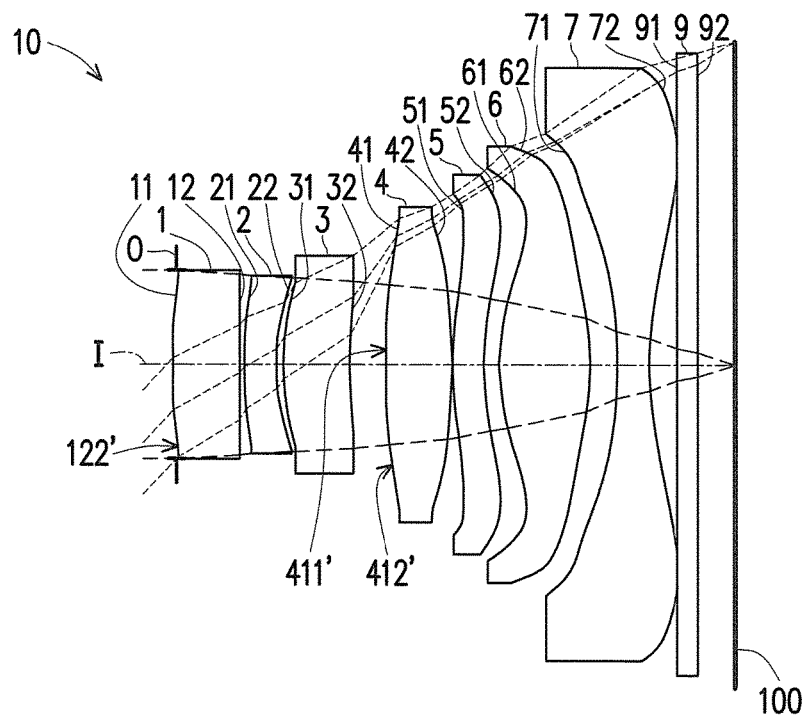
FIG. 14 is a schematic diagram of an optical imaging lens according to a third embodiment of the present invention.

FIG. 14 is a schematic diagram of an optical imaging lens according to a third embodiment of the present invention. FIG. 15A to FIG. 15D are various aberrations and a longitudinal spherical aberration in a case in which a pupil radius is 0.9850 mm of an optical imaging lens according to the third embodiment. First, referring to FIG. 14, the optical imaging lens 10 of the third embodiment of the present invention is substantially similar to the first embodiment, and is merely different in the optical data, the aspheric constants, and parameters between the first lens element 1, the second lens element 2, the third lens element 3, the fourth lens element 4, the fifth lens element 5, the sixth lens element 6, the seventh lens element 7 (for example, a radius of curvature, refracting power, center thickness, aspheric constants, or a system focal length); and is different in that the image-side surface 12 of the first lens element 1 has a concave portion 122' in a vicinity of a periphery, the object-side surface 41 of the fourth lens element 4 is a convex surface, the object-side surface 41 of the fourth lens element 4 has a convex portion 411' in a vicinity of the optical axis and a convex portion 412' in a vicinity of a periphery. Herein, it should be noted that in order to clearly show the diagram, FIG. 14 omits numbers of the concave portions and the convex portions same to those in the first embodiment.

Detailed optical data of the optical imaging lens 10 according to the third embodiment is shown in FIG. 16. Moreover, in the third embodiment, an entire EFL is 2.955 mm, and an HFOV is 46.748°. A TTL of the optical imaging lens 10 according to the third embodiment is 5.842 mm, and an $F_{NO}$ is 1.5.

FIG. 17 shows aspheric constants in formula (1) from the object-side surface 11 of the first lens element 1 to the image-side surface 72 of the seventh lens element 7 according to the third embodiment.

In addition, key parameters and relationships between the key parameters of the optical imaging lens 10 of the third embodiment are shown in FIG. 42 and FIG. 43.

Figures 15A, 15B, 15C, 15D:
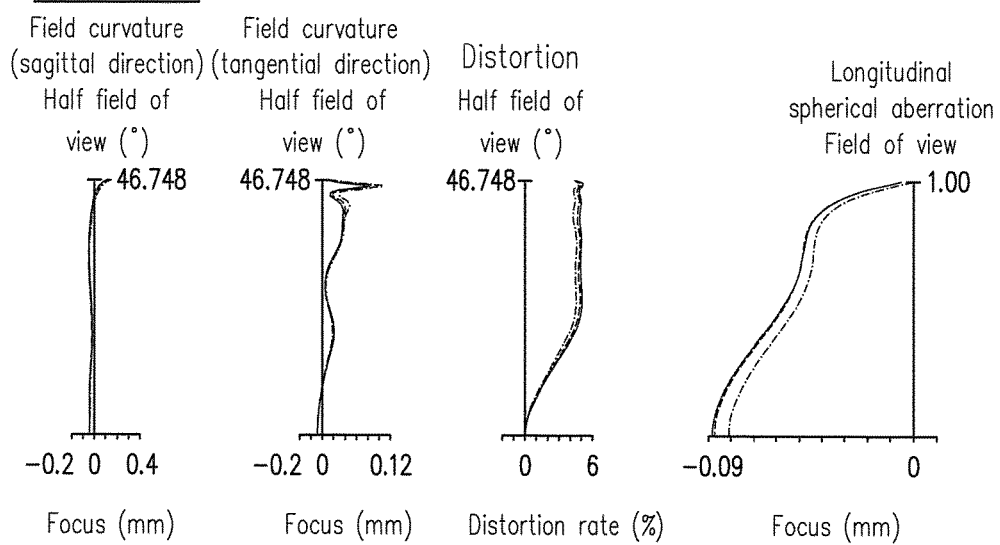
FIG. 15A to FIG. 15D are various aberrations and a longitudinal spherical aberration of an optical imaging lens according to a third embodiment.

Referring to FIG. 15A, in a diagram of a field curvature aberration in a sagittal direction of FIG. 15A, focus variations of representative wavelengths of red, green, and blue within a range of an entire field of view fall within a range between −0.2-0.4 mm. Referring to FIG. 15B, in a diagram of a field curvature aberration in the tangential direction of FIG. 15B, focus variations of the representative wavelengths of red, green, and blue within the range of the entire field of view fall within a range between −0.2-0.12 mm. Referring to FIG. 15C, a diagram of distortion aberrations in FIG. 15C shows that the distortion aberrations according to the present third embodiment are maintained within a range between 0-6%. Referring to FIG. 15D, in a diagram of longitudinal spherical aberrations of FIG. 15D of the present third embodiment, a deviation of imaging points of off-axis rays of different heights is controlled within a range from −0.09 mm to 0 mm. On this basis, as compared with an existing optical lens, the present third embodiment can still provide a better image quality under a condition that the TTL is shortened to be about 5.842 mm.

It can be known from the foregoing description that the present third embodiment has the following advantages as compared with the first embodiment: the HFOV of the second embodiment is greater than the HFOV of first embodiment; and the TTL of the second embodiment is smaller than the TTL of the first embodiment.

Figure 18:
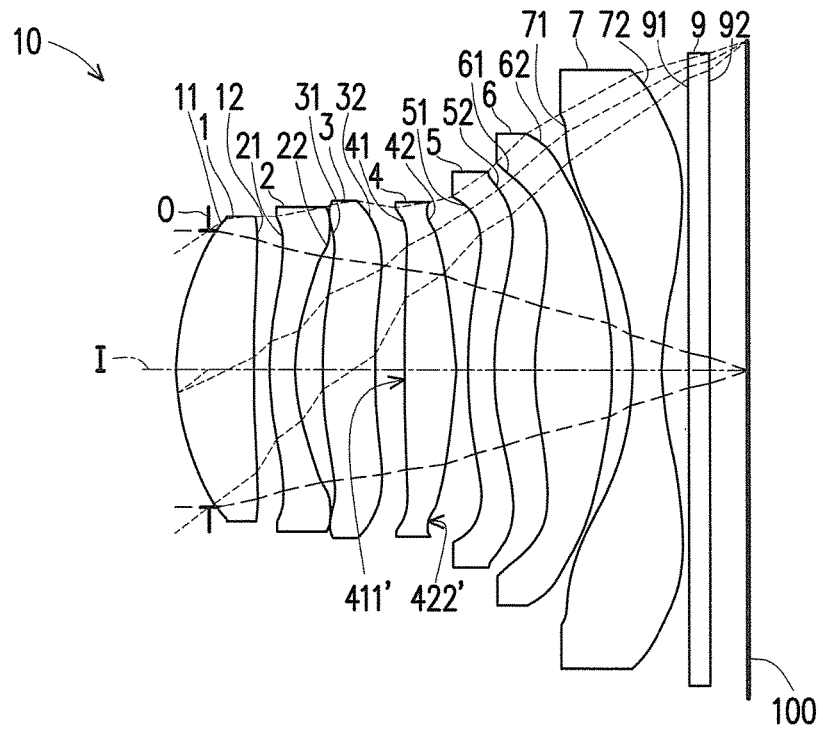
FIG. 18 is a schematic diagram of an optical imaging lens according to a fourth embodiment of the present invention.

FIG. 18 is a schematic diagram of an optical imaging lens according to a fourth embodiment of the present invention. FIG. 19A to FIG. 19D are various aberrations diagrams and longitudinal spherical aberrations in a case in which a pupil radius is 1.4050 mm of an optical imaging lens according to the fourth embodiment. First, referring to FIG. 18, the optical imaging lens 10 of the fourth embodiment of the present invention is substantially similar to the first embodiment, and is merely different in the optical data, the aspheric constants, and parameters between the first lens element 1, the second lens element 2, the third lens element 3, the fourth lens element 4, the fifth lens element 5, the sixth lens element 6, the seventh lens element 7 (for example, a radius of curvature, refracting power, center thickness, aspheric constants, or a system focal length); and is different in that the object-side surface 41 of the fourth lens element 4 has a convex portion 411' in a vicinity of the optical axis, and the image-side surface 42 of the fourth lens element 4 has a concave portion 422' in a vicinity of a periphery. Herein, it should be noted that in order to clearly show the diagram, FIG. 18 omits numbers of the concave portion and the convex portion same to those in the first embodiment.

Detailed optical data of the optical imaging lens 10 according to the fourth embodiment is shown in FIG. 20. Moreover, in the fourth embodiment, an EFL is 4.215 mm, and an HFOV is 37.779°. A TTL of the optical imaging lens 10 according to the fourth embodiment is 5.793 mm, and an $F_{NO}$ is 1.5.

FIG. 21 shows aspheric constants in formula (1) from the object-side surface 11 of the first lens element 1 to the image-side surface 72 of the seventh lens element 7 according to the fourth embodiment.

In addition, key parameters and relationships between the key parameters of the optical imaging lens 10 of the fourth embodiment are shown in FIG. 42 and FIG. 43.

Figures 19A, 19B, 19C, 19D:
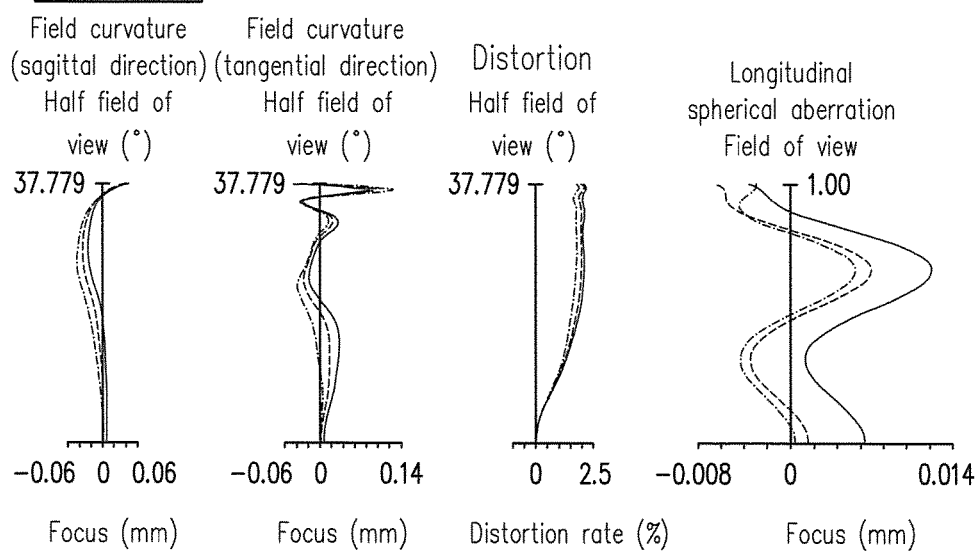
FIG. 19A to FIG. 19D are various aberrations and a longitudinal spherical aberration of an optical imaging lens according to a fourth embodiment.

Referring to FIG. 19A, in a diagram of a field curvature aberration in a sagittal direction of FIG. 19A, focus variations of representative wavelengths of red, green, and blue within a range of an entire field of view fall within a range between −0.06-0.06 mm. Referring to FIG. 19B, in a diagram of a field curvature aberration in a tangential direction of FIG. 19B, focus variations of the representative wavelengths of red, green, and blue within the range of the entire field of view fall within a range between −0.06-0.14 mm. Referring to FIG. 19C, a diagram of distortion aberrations in FIG. 19C shows that the distortion aberrations according to the present fourth embodiment are maintained within a range between 0-2.5%. Referring to FIG. 19D, in a diagram of longitudinal spherical aberrations in FIG. 11D according to the present fourth embodiment, a deviation of imaging points of off-axis rays of different heights is controlled within a range from −0.008 mm to 0.014 mm. On this basis, as compared with the first embodiment, the present fourth embodiment can still provide a better image quality under a condition that the TTL is shortened to be about 5.793 nm.

It can be known from the foregoing description that the fourth embodiment has the following advantages as compared with the first embodiment: the HFOV of the fourth embodiment is greater than that of first embodiment; the TTL of the fourth embodiment is smaller than that of the first embodiment; the field curvature aberration in the sagittal direction of the fourth embodiment is smaller than that of the first embodiment; and the longitudinal spherical aberration of the fourth embodiment is smaller than that of the first embodiment.

Figure 22:
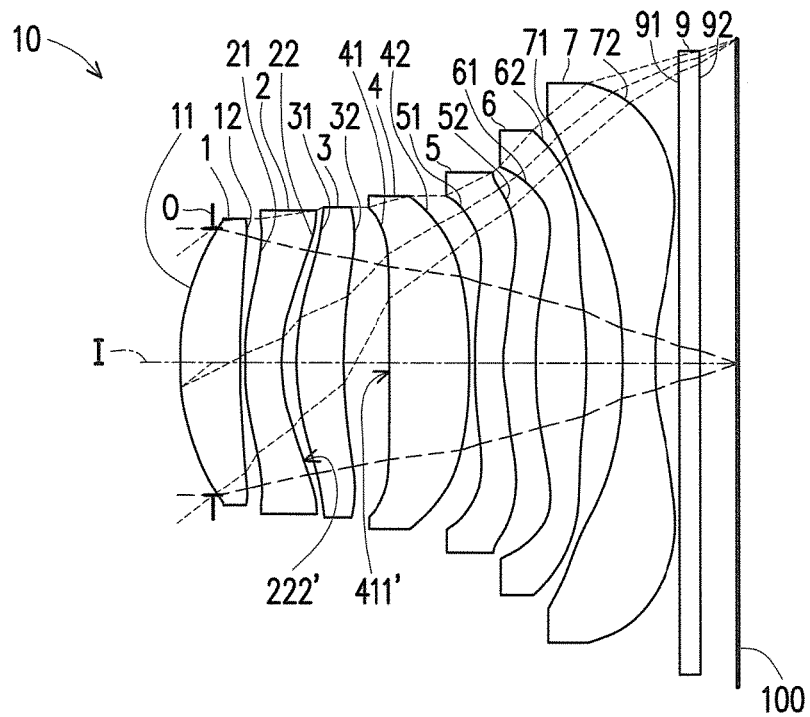
FIG. 22 is a schematic diagram of an optical imaging lens according to a fourth embodiment of the present invention.

FIG. 22 is a schematic diagram of an optical imaging lens according to a fifth embodiment of the present invention. FIG. 23A to FIG. 23D are aberration diagrams and a longitudinal spherical aberration in a case in which a pupil radius is 1.3738 mm of an optical imaging lens according to the fifth embodiment. First, referring to FIG. 22, the optical imaging lens 10 of the fifth embodiment of the present invention is substantially similar to the first embodiment, and is merely different in the optical data, the aspheric constants, and parameters between the first lens element 1, the second lens element 2, the third lens element 3, the fourth lens element 4, the fifth lens element 5, the sixth lens element 6, the seventh lens element 7 (for example, a radius of curvature, refracting power, center thickness, aspheric constants, or a system focal length); and is different in that the image-side surface 22 of the second lens element 2 has a concave portion 222' in a vicinity of a periphery, and the object-side surface 41 of the fourth lens element 4 has a convex portion 411' in a vicinity of the optical axis. Herein, it should be noted that in order to clearly show the diagram, FIG. 22 omits numbers of the concave portion and the convex portion same to those in the first embodiment.

Detailed optical data of the optical imaging lens 10 according to the fifth embodiment is shown in FIG. 24. Moreover, in the fifth embodiment, an EFL is 4.122 mm, and an HFOV is 37.755°. A TTL of the optical imaging lens 10 according to the fifth embodiment is 5.738 mm, and an $F_{NO}$ is 1.5.

FIG. 25 shows aspheric constants in formula (1) from the object-side surface 11 of the first lens element 1 to the image-side surface 72 of the seventh lens element 7 according to the fifth embodiment.

In addition, key parameters and relationships between the key parameters of the optical imaging lens 10 of the fifth embodiment are shown in FIG. 42 and FIG. 43.

Figures 23A, 23B, 23C, 23D:
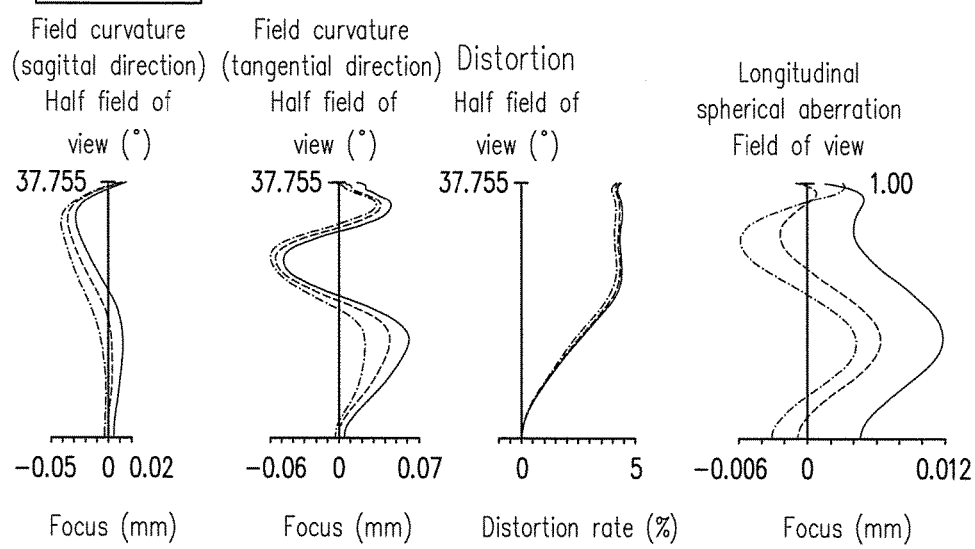
FIG. 23A to FIG. 23D are various aberrations and a longitudinal spherical aberration of an optical imaging lens according to a fifth embodiment.

Referring to FIG. 23A, in a diagram of a field curvature aberration in a sagittal direction of FIG. 23A, focus variations of representative wavelengths of red, green, and blue within a range of an entire field of view fall within a range between −0.05-0.02 mm. Referring to FIG. 23B, in a diagram of a field curvature aberration in a tangential direction of FIG. 23B, focus variations of the representative wavelengths of red, green, and blue within the range of the entire field of view fall within a range between −0.06-0.07 mm. Referring to FIG. 23C, a diagram of distortion aberrations in FIG. 23C shows that the distortion aberrations according to the present fifth embodiment are maintained within a range between 0-5%. Referring to FIG. 23D, in a diagram of a longitudinal spherical aberration of FIG. 23 of the present fifth embodiment, a deviation of imaging points of off-axis rays of different heights is controlled within a range from −0.006 mm to 0.012 mm. On this basis, as compared with an existing optical lens, the present fifth embodiment can still provide a better image quality under a condition that the TTL is shortened to be about 5.738 mm.

It can be known from the foregoing description that: the HFOV of the fifth embodiment is greater than that of first embodiment; the TTL of the fifth embodiment is smaller than that of the first embodiment; the field curvature aberration in the sagittal direction and the field curvature aberration in the tangential direction of the fifth embodiment are smaller than those of the first embodiment; and the longitudinal spherical aberration of the fifth embodiment is smaller than that of the first embodiment.

Figure 26:
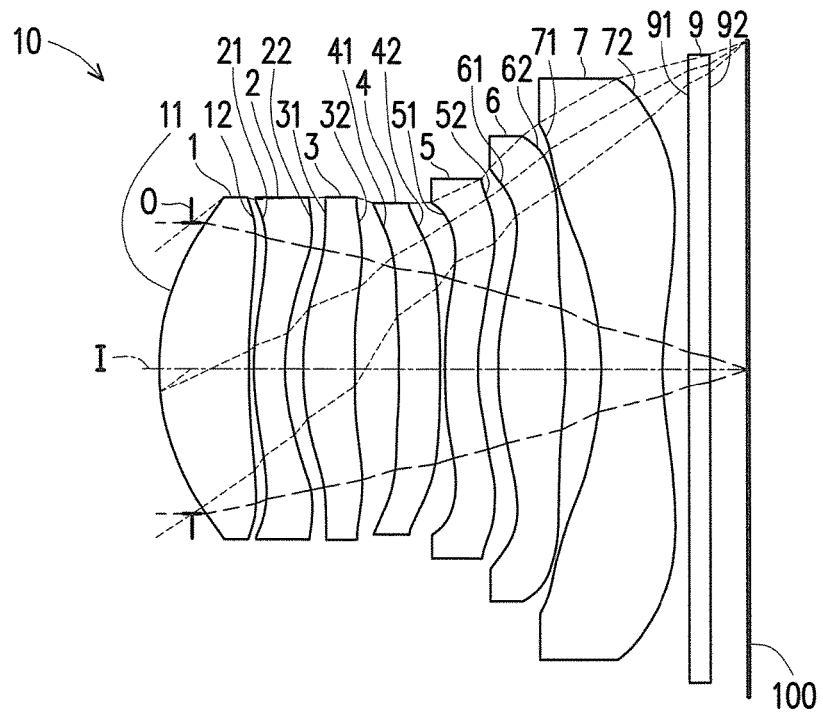
FIG. 26 is a schematic diagram of an optical imaging lens according to a sixth embodiment of the present invention.

FIG. 26 is a schematic diagram of an optical imaging lens according to a sixth embodiment of the present invention. FIG. 27A to FIG. 27D are aberration diagrams and a longitudinal spherical aberration in a case in which a pupil radius is 1.4912 mm of an optical imaging lens according to the sixth embodiment. First, referring to FIG. 26, the optical imaging lens 10 of the sixth embodiment of the present invention is substantially similar to the first embodiment, and is merely different in the optical data, the aspheric constants, and parameters between the first lens element 1, the second lens element 2, the third lens element 3, the fourth lens element 4, the fifth lens element 5, the sixth lens element 6, the seventh lens element 7 (for example, a radius of curvature, refracting power, center thickness, aspheric constants, or a system focal length). Herein, it should be noted that in order to clearly show the diagram, FIG. 26 omits some of numbers of the concave portion and the convex portion same to those in the first embodiment.

Detailed optical data of the optical imaging lens 10 according to the sixth embodiment is shown in FIG. 28. Moreover, in the sixth embodiment, an entire EFL is 4.474 mm, and an HFOV is 36.221°. A TTL of the optical imaging lens 10 according to the sixth embodiment is 5.980 mm, and an $F_{NO}$ is 1.5.

FIG. 29 shows aspheric constants in formula (1) from the object-side surface 11 of the first lens element 1 to the image-side surface 72 of the seventh lens element 7 according to the sixth embodiment.

In addition, key parameters and relationships between the key parameters of the optical imaging lens 10 of the sixth embodiment are shown in FIG. 42 and FIG. 43.

Figures 27A, 27B, 27C, 27D:
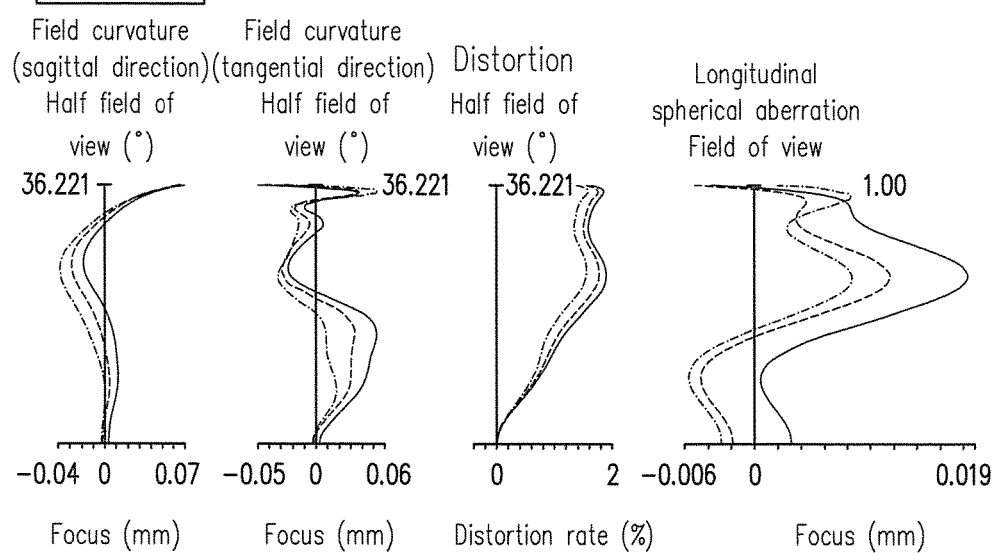
FIG. 27A to FIG. 27D are various aberrations and a longitudinal spherical aberrations of an optical imaging lens according to a sixth embodiment.

Referring to FIG. 27A, in a diagram of a field curvature aberration in a sagittal direction of FIG. 27A, focus variations of representative wavelengths of red, green, and blue within a range of an entire field of view fall within a range between −0.04-0.07 mm. Referring to FIG. 27B, in a diagram of a field curvature aberration in a tangential direction of FIG. 27B, focus variations of the representative wavelengths of red, green, and blue within the range of the entire field of view fall within a range between −0.05-0.06 mm. Referring to FIG. 27C, a diagram of distortion aberrations in FIG. 27C shows that the distortion aberrations according to the present sixth embodiment are maintained within a range between 0-2%. Referring to FIG. 27D, in a diagram of longitudinal spherical aberrations in FIG. 27D according to the present sixth embodiment, a deviation of imaging points of off-axis rays of different heights is controlled within a range from −0.006 mm to 0.019 mm. On this basis, as compared with the first embodiment, the present sixth embodiment can still provide a better image quality under a condition that the TTL is shortened to be about 5.980 mm.

It can be known from the foregoing description that the sixth embodiment has the following advantages as compared with the first embodiment: the HFOV of the sixth embodiment is greater than that of first embodiment; the field curvature aberration in the sagittal direction and the field curvature aberration in the tangential direction of the sixth embodiment are smaller than those of the first embodiment; and the TTL of the sixth embodiment is smaller than that of the first embodiment.

Figure 30:
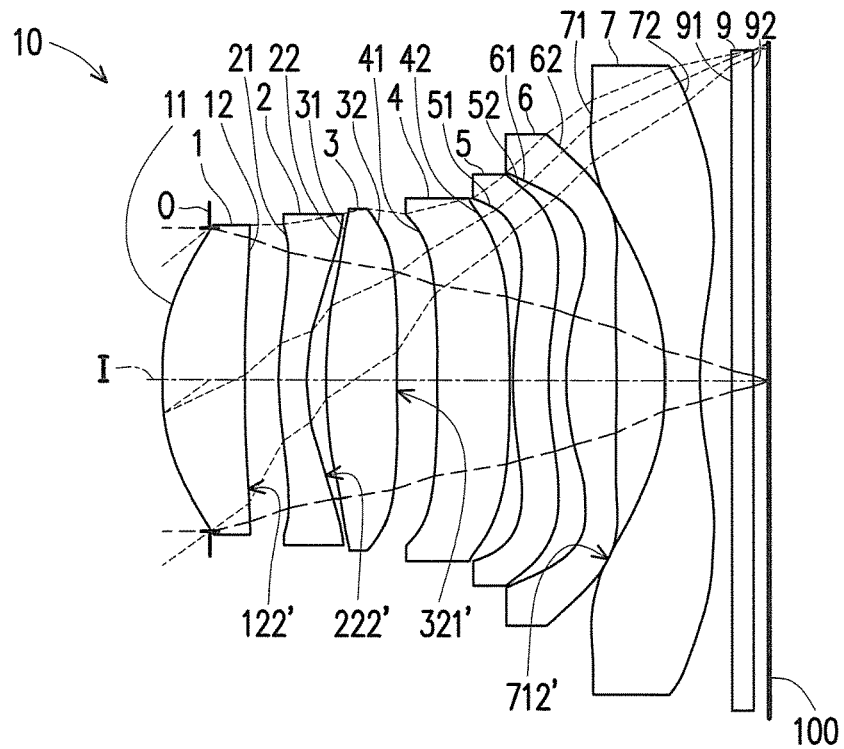
FIG. 30 is a schematic diagram of an optical imaging lens according to a seventh embodiment of the present invention.

FIG. 30 is a schematic diagram of an optical imaging lens according to a seventh embodiment of the present invention. FIG. 31A to FIG. 31D are aberration diagrams and a longitudinal spherical aberration in a case in which a pupil radius is 1.4989 mm of an optical imaging lens according to the seventh embodiment. First, referring to FIG. 30, the optical imaging lens 10 of the third embodiment of the present invention is substantially similar to the first embodiment, and is merely different in the optical data, the aspheric constants, and parameters between the first lens element 1, the second lens element 2, the third lens element 3, the fourth lens element 4, the fifth lens element 5, the sixth lens element 6, the seventh lens element 7 (for example, a radius of curvature, refracting power, center thickness, aspheric constants, or a system focal length); and is different in that the image-side surface 12 of the first lens element 1 has a concave portion 122' in a vicinity of a periphery, the image-side surface 22 of the second lens element 2 has a concave portion 222' in a vicinity of a periphery, the image-side surface 32 of the third lens element 3 has a convex portion 321' in a vicinity of the optical axis, and a portion in a vicinity of a periphery of the object-side surface 71 of the seventh lens element 7 has a convex portion 712'. Herein, it should be noted that in order to clearly show the diagram, FIG. 30 omits numbers of the concave portions and the convex portions same to those in the first embodiment.

Detailed optical data of the optical imaging lens 10 according to the seventh embodiment is shown in FIG. 32. Moreover, in the seventh embodiment, an EFL is 4.497 mm, and an HFOV is 36.066°. A TTL of the optical imaging lens 10 according to the seventh embodiment is 5.989 mm, and an $F_{NO}$ is 1.5.

FIG. 33 shows aspheric constants in formula (1) from the object-side surface 11 of the first lens element 1 to the image-side surface 72 of the seventh lens element 7 according to the seventh embodiment.

In addition, key parameters and relationships between the key parameters of the optical imaging lens 10 of the seventh embodiment are shown in FIG. 42 and FIG. 43.

Figures 31A, 31B, 31C, 31D:
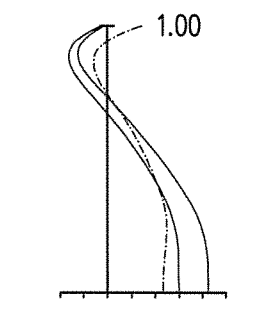
FIG. 31A to FIG. 31D are various aberrations and a longitudinal spherical aberration of an optical imaging lens according to a seventh embodiment.

Referring to FIG. 31A, in a diagram of a field curvature aberration in a sagittal direction of FIG. 31A, focus variations of representative wavelengths of red, green, and blue within a range of an entire field of view fall within a range between −0.04-0.04 mm. Referring to FIG. 31B, in a diagram of a field curvature aberration in a tangential direction of FIG. 31B, focus variations of the representative wavelengths of red, green, and blue within the range of the entire field of view fall within a range between −0.06-0.12 mm. Referring to FIG. 31C, a diagram of distortion aberrations in FIG. 31C shows that the distortion aberrations according to the present seventh embodiment are maintained within a range between 0-3.5%. Referring to FIG. 31D, in a diagram of longitudinal spherical aberrations in FIG. 31D according to the present seventh embodiment, a deviation of imaging points of off-axis rays of different heights is controlled within a range from −0.01 mm to 0.025 mm. On this basis, as compared with an existing optical lens, the present seventh embodiment can still provide a better image quality under a condition that the TTL is shortened to be about 5.989 mm.

It can be known from the foregoing description that the seventh embodiment has the following advantage as compared with the first embodiment: the field curvature aberration in the sagittal direction of the seventh embodiment is smaller than that of the first embodiment.

FIG. 34 is a schematic diagram of an optical imaging lens according to an eighth embodiment of the present invention. FIG. 35A to FIG. 35D are aberration diagrams and a longitudinal spherical aberration in a case in which a pupil radius is 1.5153 mm of an optical imaging lens according to the eighth embodiment. First, referring to FIG. 34, the optical imaging lens 10 of the eighth embodiment of the present invention is substantially similar to the first embodiment, and is merely different in the optical data, the aspheric constants, and parameters between the first lens element 1, the second lens element 2, the third lens element 3, the fourth lens element 4, the fifth lens element 5, the sixth lens element 6, the seventh lens element 7 (for example, a radius of curvature, refracting power, center thickness, aspheric constants, or a system focal length); and is different in that the image-side surface 12 of the first lens element 1 has a concave portion 122' in a vicinity of a periphery, the image-side surface 22 of the second lens element 2 has a concave portion 222' in a vicinity of a periphery, the image-side surface 32 of the third lens element 3 has a convex portion 321' in a vicinity of the optical axis, and the object-side surface 71 of the seventh lens element 7 has a convex portion 712' in a vicinity of a periphery. Herein, it should be noted that in order to clearly show the diagram, FIG. 34 omits some of numbers of the concave portions and the convex portions same to those in the eighth embodiment.

Detailed optical data of the optical imaging lens 10 according to the eighth embodiment is shown in FIG. 36. Moreover, in the eighth embodiment, an EFL is 4.546 mm, and an HFOV is 35.806°. A TTL of the optical imaging lens 10 according to the eighth embodiment is 6.001 mm, and an $F_{NO}$ is 1.5.

FIG. 37 shows aspheric constants in formula (1) from the object-side surface 11 of the first lens element 1 to the image-side surface 72 of the seventh lens element 7 according to the eighth embodiment.

In addition, key parameters and relationships between the key parameters of the optical imaging lens 10 of the eighth embodiment are shown in FIG. 42 and FIG. 43.

Referring to FIG. 35A, in a diagram of a field curvature aberration in a sagittal direction of FIG. 35A, focus variations of representative wavelengths of red, green, and blue within a range of an entire field of view fall within a range between −0.02-0.04 mm. Referring to FIG. 35B, in a diagram of a field curvature aberration in a tangential direction of FIG. 35B, focus variations of the representative wavelengths of red, green, and blue within the range of the entire field of view fall within a range between −0.06-0.16 mm. Referring to FIG. 35C, a diagram of distortion aberrations in FIG. 35C shows that the distortion aberrations according to the present eighth embodiment are maintained within a range between 0-2.5%. Referring to FIG. 35D, in a diagram of longitudinal spherical aberrations in FIG. 35D according to the present eighth embodiment, a deviation of imaging points of off-axis rays of different heights is controlled within a range from −0.005 mm to 0.025 mm. On this basis, as compared with an existing optical lens, the present eighth embodiment can still provide a better image quality under a condition that the TTL is shortened to be about 6.001 mm.

It can be known from the foregoing description that the eighth embodiment has the following advantage as compared with the first embodiment: the field curvature aberration in the sagittal direction of the eighth embodiment is smaller than that of the first embodiment.

FIG. 38 is a schematic diagram of an optical imaging lens according to a ninth embodiment of the present invention. FIG. 39A to FIG. 39D are aberration diagrams and a longitudinal spherical aberration in a case in which a pupil radius is 1.3562 mm of an optical imaging lens according to the ninth embodiment. First, referring to FIG. 38, the optical imaging lens 10 of the ninth embodiment of the present invention is substantially similar to the first embodiment, and is merely different in the optical data, the aspheric constants, and parameters between the first lens element 1, the second lens element 2, the third lens element 3, the fourth lens element 4, the fifth lens element 5, the sixth lens element 6, the seventh lens element 7 (for example, a radius of curvature, refracting power, center thickness, aspheric constants, or a system focal length); and is different in that the image-side surface 52 of the fifth lens element 5 has a concave portion 522' in a vicinity of a periphery. Herein, it should be noted that in order to clearly show the diagram, FIG. 38 omits some of numbers of concave portions and convex portions same to those in the first embodiment.

Detailed optical data of an optical imaging lens 10 according to the ninth embodiment is shown in FIG. 40. Moreover, in the ninth embodiment, an EFL is 4.069 mm, and an HFOV is 38.954°. A TTL of the optical imaging lens 10 according to the ninth embodiment is 5.763 mm, and an $F_{NO}$ is 1.5.

FIG. 41 shows aspheric constants in formula (1) from the object-side surface 11 of the first lens element 1 to the image-side surface 72 of the seventh lens element 7 according to the ninth embodiment.

In addition, key parameters and relationships between the key parameters of the optical imaging lens 10 of the ninth embodiment are shown in FIG. 42 and FIG. 43.

Referring to FIG. 39A, in a diagram of a field curvature aberration in a sagittal direction of FIG. 39A, focus variations of representative wavelengths of red, green, and blue within a range of an entire field of view fall within a range between −0.04-0.06 mm. Referring to FIG. 39B, in a diagram of a field curvature aberration in a tangential direction of FIG. 39B, focus variations of the representative wavelengths of red, green, and blue within the range of the entire field of view fall within a range between −0.06-0.12 mm. Referring to FIG. 39C, a diagram of distortion aberrations in FIG. 39C shows that the distortion aberrations according to the present ninth embodiment are maintained within a range between −1-2.5%. Referring to FIG. 39D, in a diagram of FIG. 39D of longitudinal spherical aberrations according to the present ninth embodiment, a deviation of imaging points of off-axis rays of different heights is controlled within a range from −0.005 mm to 0.035 mm. On this basis, as compared with an existing optical lens, the present ninth embodiment can still provide a better image quality under a condition that a TTL is shortened to be about 5.763 mm.

It can be known from the foregoing description that the ninth embodiment has the following advantages as compared with the first embodiment: the HFOV of the ninth embodiment is greater than that of first embodiment; the TTL of the ninth embodiment is smaller than that of the first embodiment; and the field curvature aberration in the sagittal direction of the ninth embodiment is smaller than that of the first embodiment.

In at least one of the foregoing embodiments from the first embodiment to the ninth embodiment, the first lens element has positive refracting power and therefore has good light converging effect; the object-side surface of the third lens element is designed to have a convex portion in a vicinity of a periphery, and the object-side surface of the fifth lens element is designed to have a convex portion in a vicinity of the optical axis and a concave portion in the vicinity of the periphery; and in addition, the object-side surface of the sixth lens element has a concave portion in a vicinity of the periphery, or the image-side surface of the seventh lens element comprises a convex portion in a vicinity of the periphery, which has good effects on correcting an aberration.

Subsequently, FIG. 43 is a table of optical parameters in the foregoing embodiments from the first embodiment to the ninth embodiment. When relational expressions between the optical parameters in the optical imaging lens 10 of the embodiments of the present invention satisfy at least one of the following conditional expressions, a designer may be assisted to design an optical imaging lens which has good optical performances and an effectively shortened TTL, and is technically practicable:

I. When the optical imaging lens of the embodiments of the present invention satisfies any one of the following conditional expressions, an effect of shortening the TTL is achieved by reducing an air gap between lens elements or shortening thickness of a lens element, and meanwhile considering the difficulty for manufacturing: ALT/(T3+T4) ≤4.0; AAG/(G12+G34)≤3.6; TTL/EFL≤2.5; AAG/(G34+G67)≤3.0; Tmax/Tmin≤3.0; TL/(T1+T3+T6)≤3.0; (T1+T6)/(T2+T5)≥1.7; (G67+T7)/(T4+G45)≤2.1; EFL/T3≤8.5; (ALT+AAG)/EFL≤2.1; (T1+T2+T3)/T7≥2.8; AAG/(G34+G56)≤2.8; (T6+G67)/T5≥2.0; (G34+T4)/(G12+T2)≥1.8; (T3+T4)/G34≤3 0.7; EFL/T1≥3; or (T3+G34)/T2≥2.5.

II. When the optical imaging lens of the present invention satisfies any one of the following conditional expressions, it indicates that the optical imaging lens has a better configuration and can generate a good image quality on the premise of ensuring appropriate yield: 2.5≤ALT/(T3+T4)≤4.0; 2.0≤AAG/(G12+G34)≤3.6; 1.0≤TTL/EFL≤2.5; 1.0≤AAG/(G34+G67)≤3.0; 2.2≤Tmax/Tmin≤3.0; 2.0≤TL/(T1+T3+T6)≤3.0; 3.0≥(T1+T6)/(T2+T5)≥1.7; 0.5≤(G67+T7)/(T4+G45)≤2.1; 4.3≤EFL/T3≤8.5; 1.0≤(ALT+AAG)/EFL≤2.1; 6.0≥(T1+T2+T3)/T7≥2.8; 1.5≤AAG/(G34+G56)≤2.8; 4.7≥(T6+G67)/T5≥2.0; 3.1≥(G34+T4)/(G12+T2)≥1.8; 2.0≤(T3+T4)/G34≤3.7; 6.8≥EFL/T1≥3; 4.0≥(T3+G34)/T2≥2.5.

However, considering unpredictability of design of an optical system, under an architecture of the embodiments of the present invention, satisfying the foregoing conditional expressions can better shorten a lens length of the lens of the present invention, may enlarge an available aperture stop, increase a field of view, improve an image quality, or improve assembling yield, so that disadvantages of the prior art are improved.

Based on the above, the optical imaging lens 10 of the embodiments of the present invention may have the following effects and advantages:

The longitudinal spherical aberrations, astigmatic aberrations, and distortions of the embodiments of the present invention all meet usage specifications. In addition, off-axis rays at different heights of the representative wavelengths of red, green, and blue are all converged nearby an imaging point. It can be seen from a deflection amplitude of each curve that deviations of imaging points of the off-axis rays at different heights are all controlled to have good spherical aberrations, aberrations, and distortion inhibiting capabilities. Further referring to data of the image quality, distances between the representative wavelengths of red, green, and blue are also approximate to each other, indicating that the present invention, under different statuses, has good convergence for rays of different wavelength, so as to have a good dispersion inhibiting capability. Based on the above, the present invention can generate an excellent image quality via the design and association of the lens.

Although the present invention discloses the foregoing by using the embodiment, the foregoing is not intended to limit the present invention. Any person of ordinary skill in the art may make some variations and modifications without departing from the scope and spirit of the invention. Therefore, the protection scope of the present invention should fall within the scope defined by the appended claims below.

What is claimed is:
1. An optical imaging lens, comprising:
a first lens element, a second lens element, a third lens element, a fourth lens element, a fifth lens element, a sixth lens element, and a seventh lens element arranged in a sequence from an object side to an image side along an optical axis, wherein each of the first lens element to the seventh lens element has an object-side surface facing the object side and pervious to an imaging ray and an image-side surface facing the image side and pervious to the imaging ray;
wherein the object-side surface of the third lens element has a convex portion in a vicinity of the optical axis and a convex portion in a vicinity of a periphery of the third lens element;
the object-side surface of the fifth lens element has a convex portion in a vicinity of the optical axis and a concave portion in a vicinity of a periphery of the fifth lens element;
the object-side surface of the sixth lens element has a concave portion in a vicinity of a periphery of the sixth lens element; and
lens elements having refracting power of the optical imaging lens are only the first lens element to the seventh lens element,
wherein the optical imaging lens satisfies:
(G67+T7)/(T4+G45)≤2.1, wherein G67 is an air gap between the sixth lens element and the seventh lens element on the optical axis, T7 is a center thickness of the seventh lens element on the optical axis, T4 is a center thickness of the fourth lens element on the optical axis, and G45 is an air gap between the fourth lens element and the fifth lens element on the optical axis.

2. The optical imaging lens according to claim 1, wherein the optical imaging lens satisfies:
Tmax/Tmin≤3.0, wherein Tmax is a maximum value of center thicknesses of seven lenses from the first lens element to the seventh lens element on the optical axis, and Tmin is a minimum value of the center thicknesses of the lenses from the first lens element to the seventh lens element on the optical axis.

3. The optical imaging lens according to claim 1, wherein the optical imaging lens satisfies:
AAG/(G12+G34)≤3.6, wherein AAG is a sum of six air gaps of the first lens element to the seventh lens element on the optical axis, G12 is an air gap between the first lens element and the second lens element on the optical axis, and G34 is an air gap between the third lens element and the fourth lens element on the optical axis.

4. The optical imaging lens according to claim 1, wherein the optical imaging lens satisfies:
TTL/EFL≤2.5, wherein TTL is a distance on the optical axis from the object-side surface of the first lens element to an image plane of the optical imaging lens, and EFL is an effective focal length of the optical imaging lens.

5. The optical imaging lens according to claim 1, wherein the optical imaging lens satisfies:
AAG/(G34+G67)≤3.0, wherein AAG is a sum of six air gaps of the first lens element to the seventh lens element on the optical axis, and G34 is an air gap between the third lens element and the fourth lens element on the optical axis.

6. The optical imaging lens according to claim 1, wherein the optical imaging lens satisfies:
ALT/(T3+T4)≤4.0, wherein ALT is a sum of center thicknesses of seven lenses fom the first lens element to the seventh lens element on the optical axis, and T3 is a center thickness of the third lens element on the optical axis.

7. The optical imaging lens according to claim 1, wherein the optical imaging lens satisfies:
TL/(T1+T3+T6)≤3.0, wherein TL is a distance on the optical axis from the object-side surface of the first lens element to the image-side surface of the seventh lens element, T1 is a center thickness of the first lens element on the optical axis, T3 is a center thickness of the third lens element on the optical axis, and T6 is a center thickness of the sixth lens element on the optical axis.

8. The optical imaging lens according to claim 1, wherein the optical imaging lens satisfies:
(T1+T6)/(T2+T5)≥1.7, wherein T1 is a center thickness of the first lens element on the optical axis, T6 is a center thickness of the sixth lens element on the optical axis, T2 is a center thickness of the second lens element on the optical axis, and T5 is a center thickness of the fifth lens element on the optical axis.

9. The optical imaging lens according to claim 1, wherein the optical imaging lens satisfies:
EFL/T3≤8.5, wherein EFL is an effective focal length of the optical imaging lens, and T3 is a center thickness of the third lens element on the optical axis.

10. An optical imaging lens, comprising:
a first lens element, a second lens element, a third lens element, a fourth lens element, a fifth lens element, a sixth lens element, and a seventh lens element arranged in a sequence from an object side to an image side along an optical axis, wherein each of the first lens element to the seventh lens element has an object-side surface facing the object side and pervious to an imaging ray and an image-side surface facing the image side and pervious to the imaging ray;
wherein the first lens element has positive refracting power;
the object-side surface of the third lens element has a convex portion in a vicinity of the optical axis and a convex portion in a vicinity of a periphery of the third lens element;
the object-side surface of the fifth lens element has a convex portion in a vicinity of the optical axis and a concave portion in a vicinity of the periphery of the fifth lens element;
the image-side surface of the seventh lens element has a convex portion in a vicinity of a periphery of the seventh lens element; and
lens elements having refracting power of the optical imaging lens are only the first lens element to the seventh lens element, wherein the optical imaging lens satisfies:

(G67+T7)/(T4+G45)≤2.1, wherein G67 is an air gap between the sixth lens element and the seventh lens element on the optical axis, T7 is a center thickness of the seventh lens element on the optical axis, T4 is a center thickness of the fourth lens element on the optical axis, and G45 is an air gap between the fourth lens element and the fifth lens element on the optical axis.

11. The optical imaging lens according to claim 10, wherein the optical imaging lens satisfies:

Tmax/Tmin≤3.0, wherein Tmax is a maximum value of center thicknesses of seven lenses from the first lens element to the seventh lens element on the optical axis, and Tmin is a minimum value of the center thicknesses of the lenses from the first lens element to the seventh lens element on the optical axis.

12. The optical imaging lens according to claim 10, wherein the optical imaging lens satisfies:

(T1+T2+T3)/T7≤2.8, wherein T1 is a center thickness of the first lens element on the optical axis, T2 is a center thickness of the second lens element on the optical axis, and T3 is a center thickness of the third lens element on the optical axis.

13. The optical imaging lens according to claim 10, wherein the optical imaging lens satisfies:

AAG/(G34+G56)≤2.8, wherein AAG is a sum of six air gaps of the first lens element to the seventh lens element on the optical axis, G34 is an air gap between the third lens element and the fourth lens element on the optical axis, and G56 is an air gap between the fifth lens element and the sixth lens element on the optical axis.

14. The optical imaging lens according to claim 10, wherein the optical imaging lens satisfies:

(T6+G67)/T5>2.0, wherein T6 is a center thickness of the sixth lens element on the optical axis, and T5 is a center thickness of the fifth lens element on the optical axis.

15. The optical imaging lens according to claim 10, wherein the optical imaging lens satisfies:

(G34+T4)/(G12+T2)≤1.8, wherein G34 is an air gap between the third lens element and the fourth lens element on the optical axis, G12 is an air gap between the first lens element and the second lens element on the optical axis, and T2 is a center thickness of the second lens element on the optical axis.

16. The optical imaging lens according to claim 10, wherein the optical imaging lens satisfies:

(T3+T4)/G34≤3.7, wherein T3 is a center thickness of the third lens element on the optical axis, and G34 is an air gap between the third lens element and the fourth lens element on the optical axis.

17. The optical imaging lens according to claim 10, wherein the optical imaging lens satisfies:

(ALT+AAG)/EFL≤2.1, wherein ALT is a sum of center thicknesses of seven lenses from the first lens element to the seventh lens element on the optical axis, AAG is a sum of six air gaps of the first lens element to the seventh lens element on the optical axis, and EFL is an effective focal length of the optical imaging lens.

18. The optical imaging lens according to claim 10, wherein the optical imaging lens satisfies:

EFL/T1≥3, wherein EFL is an effective focal length of the optical imaging lens, and T1 is a center thickness of the first lens element on the optical axis.

19. The optical imaging lens according to claim 10, wherein the optical imaging lens satisfies:

(T3+G34)/T2≥2.5, wherein T3 is a center thickness of the third lens element on the optical axis, G34 is an air gap between the third lens element and the fourth lens element on the optical axis, and T2 is a center thickness of the second lens element on the optical axis.

* * * * *